(12) United States Patent
Fuse

(10) Patent No.: US 7,757,473 B2
(45) Date of Patent: Jul. 20, 2010

(54) MANUFACTURE METHOD OF POWER TRANSMISSION CHAIN AND A POWER-TRANSMISSION-CHAIN MANUFACTURING APPARATUS EMPLOYED BY THE MANUFACTURE METHOD

(75) Inventor: Masaru Fuse, Kashihara (JP)

(73) Assignee: Jtekt Corporation, Osaka-Shi (JP)

( * ) Notice: Subject to any disclaimer, the term of this patent is extended or adjusted under 35 U.S.C. 154(b) by 657 days.

(21) Appl. No.: 11/663,357

(22) PCT Filed: Sep. 28, 2005

(86) PCT No.: PCT/JP2005/017860

§ 371 (c)(1),
(2), (4) Date: Mar. 21, 2007

(87) PCT Pub. No.: WO2006/035819

PCT Pub. Date: Apr. 6, 2006

(65) Prior Publication Data

US 2007/0265125 A1 Nov. 15, 2007

(30) Foreign Application Priority Data

Sep. 28, 2004 (JP) ............... 2004-281425
Oct. 20, 2004 (JP) ............... 2004-305711
Oct. 20, 2004 (JP) ............... 2004-305712

(51) Int. Cl.
*B21L 9/06* (2006.01)
*F16G 13/06* (2006.01)

(52) U.S. Cl. ............ 59/35.1; 59/7; 59/8; 59/11; 474/229; 474/230; 474/251; 100/292; 29/525.01

(58) Field of Classification Search ............ 59/7, 59/8, 11, 35.1; 474/229, 230, 251; 100/292; 29/525.01

See application file for complete search history.

(56) References Cited

U.S. PATENT DOCUMENTS

| 6,490,853 | B1 | 12/2002 | Winklhofer et al. | |
| 7,140,173 | B2 * | 11/2006 | Van Rooij | 59/7 |
| 7,441,396 | B2 * | 10/2008 | Fuse | 59/7 |
| 7,617,668 | B2 * | 11/2009 | Miura | 59/8 |

FOREIGN PATENT DOCUMENTS

| CN | 1316928 A | 10/2001 |
| JP | 48-80939 A | 10/1973 |
| JP | 62-234635 A | 10/1987 |
| JP | 8-312725 A | 11/1996 |
| JP | 2002-522229 A | 7/2002 |

* cited by examiner

*Primary Examiner*—David B Jones
(74) *Attorney, Agent, or Firm*—Birch, Stewart, Kolasch & Birch, LLP

(57) ABSTRACT

Manufacture method and manufacturing apparatus for power transmission chain according to the invention are adapted to accomplish exact positioning of pin members and link plates. This permits the pin members to be positively press-inserted into pin holes of the link plates and hence, the fabrication of the power transmission chain is facilitated.

25 Claims, 8 Drawing Sheets

MANUFACTURE METHOD OF POWER TRANSMISSION CHAIN AND A POWER-TRANSMISSION-CHAIN MANUFACTURING APPARATUS EMPLOYED BY THE MANUFACTURE METHOD

TECHNICAL FIELD

The present invention relates to a method of manufacturing a power transmission chain for use in a continuously variable transmission employed by vehicles and the like, and to a power-transmission-chain manufacturing apparatus employed by the manufacture method.

BACKGROUND ART

A conventionally known power transmission chain for use in a chain-type continuously variable transmission for automotive vehicles includes: a plurality of link plates each formed with two pin holes apart from each other by a predetermined pitch; and a plurality of pin members for bendably interconnecting these link plates. As disclosed in Japanese Unexamined Patent Publication No. H8-312725, for example, such a power transmission chain is formed by placing the link plates in layers in thickness-wise and longitudinal directions of the chain and press-inserting the pin members through the pin holes for interconnecting the link plates into an endless loop form.

In the above power transmission chain, the link plates are placed in layers in a manner that the pin holes thereof are mutually aligned, while the pin members each including two pins are press-inserted through the pin holes in a manner to penetrate the chain in the width-wise direction thereof. The chain having such a structure can hardly be bent in any direction except for a direction about an axis of the pin member and is extremely low in free play such as backlash. Hence, the fabrication of the above power transmission chain requires the pin members to be exactly positioned by maintaining the longitudinal position thereof substantially vertically to side surfaces of the link plates and maintaining a predetermined pitch between a respective pair of adjoining pin members, before the pin members are press-inserted through the link plates. If this procedure is not practiced, the pin member may be out of alignment with the pin holes or seizure between the pin member and the pin hole may occur. Consequently, the pin members cannot be press-inserted through the pin holes.

In order to press-insert the pin members through the link plates, these components must be maintained in a positional relation that they are positioned just as they are assembled in the chain. This positioning of the components makes a chain assembling operation cumbersome.

In view of the foregoing problem, it is an object of the invention to provide a manufacture method of power transmission chain which facilitates the fabrication of the chain by providing the exact positioning of the pin members or the link plates, and to provide a power-transmission-chain manufacturing apparatus employed by the method.

DISCLOSURE OF THE INVENTION

According to the invention, a manufacture method for manufacturing a power transmission chain including: a plurality of link plates possessing pin holes and placed in layers in a width-wise direction; and a plurality of pin members inserted through the pin holes for interconnecting the plural link plates is characterized in that the plural pin members are retained at first ends thereof as arranged just as they are assembled in the power transmission chain; that the plural pin members are retained at second ends thereof as defining projection portions on the second end side for allowing the second ends to be inserted into the pin holes of the link plates; and that the link plates are locatably assembled with the plural pin members by inserting the projection portions into the pin holes of the link plates.

According to the manufacture method of power transmission chain constituted as described above, the pin members, arranged just as they are assembled in the power transmission chain, are retained at their first ends and second ends and permit the link plates to be mounted from the second end side when the power transmission chain is fabricated. It is therefore possible to maintain the exact positional relation between the link plates and the pin members when the pin members are inserted into the pin holes of the link plates. This ensures that the pin members are inserted through the pin holes of the link plates and hence, the fabrication of the power transmission chain is facilitated.

According to the above manufacture method of power transmission chain, it is preferred that the link plates mounted on the projection portions are slidably moved along the plural pin members from the second end side toward the first end side, thereby located at predetermined positions with respect to the width-wise direction of the power transmission chain. In this case, the fabrication of the power transmission chain may be carried out in parallel with the locating of the link plates exactly at the predetermined positions.

According to the invention, a manufacture method for manufacturing a power transmission chain including: a plurality of link plates possessing pin holes and placed in layers in a width-wise direction; and a plurality of pin members inserted through the pin holes for interconnecting the plural link plates is characterized in that the following steps (b) to (e) are repeated subsequent to the following step (a), thereby sequentially placing the link plates in layers according to a predetermined array pattern and assembling the link plates:

(a) the step of retaining first ends of the plural pin members thereby arranging the pin members just as they are assembled in the power transmission chain;

(b) the step of retaining second ends of the plural pin members as maintaining their axes in parallel to the width-wise direction of the power transmission chain to be fabricated and as allowing a predetermined number of link plate layers to be placed at the respective second ends;

(c) the step of inserting the respective second ends of the pin members through the pin holes of the link plates thereby placing the predetermined number of link plate layers at the respective second ends of the pin members;

(d) the step of releasing the second ends of the pin members from the retained state established by the step (b);

(e) the step of slidably moving the link plates, mounted on the pin members in the step (c), along the pin members thereby locating the link plates at the predetermined positions with respect to the width-wise direction of the power transmission chain.

According to the manufacture method of power transmission chain constituted as described above, the pin members, arranged just as they are assembled in the power transmission chain, are retained at their first ends and second ends during the fabrication of the power transmission chain. It is therefore possible to exactly maintain the positional relation between the link plates and the pin members when the pin members are inserted into the pin holes of the link plates. This ensures that the pin members are positively inserted through the pin holes of the link plates. The pin members inserted through the link plates have the second ends thereof released from the retained state in the step (d), thus permitting the link plates mounted thereon to be slidably moved along the pin member. Accordingly, the link plates may be located at the predetermined positions in the power transmission chain and assembled to form the chain.

That is, the manufacture method of power transmission chain according to the invention is adapted to maintain the pin members in the exactly positioned state and to positively insert the pin members through the link plates and hence, the fabrication of the power transmission chain is facilitated.

The above step (a) may be performed to arrange the plural pin members in a pattern to impart an endless loop form to the power transmission chain, thereby permitting each of the subsequent steps to assemble the power transmission chain in the endless loop form.

The above step (a) may be performed to arrange the plural pin members in a pattern to impart a linear form to the power transmission chain, so that the power transmission chain is assembled in the linear form. Accordingly, the method may further comprise a step of interconnecting opposite ends of the power transmission chain assembled in the linear form.

According to the above manufacture method of power transmission chain, the power transmission chain may be assembled in both of the endless loop form and the linear form.

According to the above manufacture method of power transmission chain, it is preferred that the predetermined number of link plate layers placed by the step (c) is one.

In this case, contact surface pressure between adjoining link plates may be adjusted properly.

According to the invention, a manufacture method for manufacturing a power transmission chain including: a plurality of link plates possessing pin holes and placed in layers in a width-wise direction; and a plurality of pin members inserted through the pin holes for interconnecting the plural link plates is characterized in that the following steps (b) to (e) are repeated a predetermined number of times subsequent to the following step (a) thereby placing the link plates in a predetermined number of layers and subsequently, the steps (c) and (e) are repeated thereby sequentially placing the link plates in layers according to a predetermined array pattern and assembling the link plates:

(a) the step of retaining first ends of the plural pin members thereby arranging the pin members just as they are assembled in the power transmission chain;

(b) the step of retaining second ends of the plural pin members as maintaining their axes in parallel to the width-wise direction of the power transmission chain to be fabricated and as allowing a predetermined number of link plate layers to be placed at the respective second ends;

(c) the step of inserting the respective second ends of the pin members through the pin holes of the link plates thereby placing the predetermined number of link plate layers at the respective second ends of the pin members;

(d) the step of releasing the second ends of the pin members from the retained state established by the step (b);

(e) the step of slidably moving the link plates, mounted on the pin members in the step (c), along the pin members thereby locating the link plates at the predetermined positions with respect to the width-wise direction of the power transmission chain.

According to the manufacture method of power transmission chain constituted as described above, when the predetermined number of link plate layers are placed at places by repeating the steps (b) to (e) the predetermined number of times, the pin members are retained by the predetermined number of link plate layers thus arranged. Hence, the step (b) of retaining the second ends of the pin members and the step (d) may be omitted. Thus, the fabrication of the power transmission chain may be further facilitated.

According to the invention, a manufacture method for manufacturing a power transmission chain including: a plurality of link plates possessing pin holes and placed in layers in a width-wise direction; and a plurality of pin members inserted through the pin holes for interconnecting the plural link plates is characterized in that the following steps (c) to (d) are repeated subsequent to the following steps (a), (b) thereby sequentially placing the link plates in layers according to a predetermined array pattern and assembling the link plates:

(a) the step of inserting the pin members in a retainer jig which receives the pin members therein for retaining the pin members at outside surfaces thereof and for arranging the pin members just as they are assembled in the power transmission chain;

(b) the step of projecting a respective first end of the pin members from the retainer jig by a length required for placing the link plates in a predetermined number of layers in the width-wise direction of the power transmission chain;

(c) the step of inserting the respective first end of the pin members through the pin holes of the link plates thereby placing the predetermined number of link plate layers at a respective projection portion defined by the respective projected first end of the pin members;

(d) the step of further projecting the respective first end of the pin members from the retainer jig by a length required for placing the predetermined number of link plate layers at the respective first end, and of slidably moving the link plates, mounted on the pin members, along the pin members.

According to the manufacture method of power transmission chain constituted as described above, the retainer jig not only arranges the pin members just as they are assembled in the power transmission chain but also retains the pin members, defining the projection portions, at the outside surfaces thereof. Therefore, the pin members may be exactly positioned relative to the link plates mounted on/placed at the projection portions. This ensures that the pin members are positively inserted through the pin holes of the link plates.

As the link plates are sequentially mounted on the pin member in increasing layers, the pin member is accordingly increased in the projection amount from the retainer jig. Therefore, the outside surface of the pin member is decreased in the area retained by the pin member. On the other hand, the pin holes of the link plates placed in layers retain the outside surface of the pin member, so that the pin member may be maintained in the exactly positioned state.

That is, the manufacture method of power transmission chain according to the invention is adapted to maintain the pin members in the exactly positioned state and to positively insert the pin members into the link plates and hence, the fabrication of the power transmission chain is facilitated.

According to the above manufacture method of power transmission chain, it is preferred that the predetermined number of link plate layers placed by the steps (b), (c), (d) is one.

In this case, the pin member is retained at a larger area of the outside surface thereof, so as to be retained more assuredly.

According to the invention, a manufacture method for manufacturing a power transmission chain including: a plurality of link plates possessing pin holes and placed in layers in a width-wise direction; and a plurality of pin members inserted through the pin holes for interconnecting the plural link plates is characterized in that the following step (e) is repeated subsequent to the following steps (a), (b), (c), (d), thereby sequentially placing the link plates in layers according to a predetermined array pattern and assembling the link plates:

(a) the step of inserting the pin members in a retainer jig which receives the pin members therein for retaining the pin members at outside surfaces thereof and for arranging the pin members just as they are assembled in the power transmission chain;

(b) the step of projecting a respective first end of the pin members from the retainer jig by a length required for placing the link plates in a predetermined number of layers in the width-wise direction of the power transmission chain;

(c) the step of inserting the respective first end of the pin members through the pin holes of the link plates thereby placing the predetermined number of link plate layers at a respective projection portion defined by the respective projected first end of the pin members;

(d) the step of further projecting the respective first end of the pin members from the retainer jig and of slidably moving the link plates mounted on the pin members along the pin members thereby locating the link plates at positions equivalent to predetermined positions thereof when the link plates are assembled in the power transmission chain;

(e) the step of inserting anew the respective first end of the pin members through predetermined number of link plate layers and of slidably moving the link plates along the pin members for locating the link plates at positions equivalent to predetermined positions thereof when the link plates are assembled in the power transmission chain.

In the step (c) of the manufacture method of power transmission chain constituted as described above, the retainer jig not only arranges the pin members just as they are assembled in the power transmission chain but also retains the pin members, defining the projection portions, at the outside surfaces thereof. Therefore, the pin members may be exactly positioned relative to the link plates mounted on/placed at the projection portions. This ensures that the pin members are positively inserted through the pin holes of the link plates.

Since the pin members are positively inserted through the pin holes of the link plates, the fabrication of the power transmission chain is facilitated.

The link plates placed at the projection portions in the step (c) are located at positions in the step (d), which are equivalent to the predetermined positions thereof when the link plates are assembled to form the power transmission chain. Hence, the link plates mounted anew on the first ends of the pin members in the step (e) may be located at the positions equivalent to the predetermined positions thereof when the link plates are assembled in the power transmission chain. This provides for a proper adjustment of the contact surface pressure between the link plates adjoining in the width-wise direction of the power transmission chain. This is effective to prevent a problem that the contact surface pressure between the adjoining link plates is increased so much that a friction drag between these link plates is increased. Therefore, the power transmission chain is prevented from suffering the decrease of power transmission efficiency which results from the increase of flexion torque associated with the increased friction drag between the link plates.

According to the above manufacture method of power transmission chain, it is preferred that the predetermined number of link plate layers placed by the steps (b), (c), (d) is two to four.

In a case where the predetermined number of link plate layers is more than four, these link plates in layers are mounted at a time and hence, the contact surface pressure between the link plates may be increased so much as to lower the power transmission efficiency of the chain. If the number of link plate layers is smaller than the above range, the outside surfaces of the pin members have such a small retained area that the pin members may not be retained assuredly.

According to the invention, a manufacture method for manufacturing a power transmission chain including: a plurality of link plates possessing pin holes and placed in layers in a width-wise direction; and a plurality of pin members inserted through the pin holes for interconnecting the plural link plates is characterized in that dummy pins, which are removably insertable in the pin holes, are inserted into the pin holes for placing the link plates in layers, whereby the plural link plates are temporarily assembled to form the power transmission chain and subsequently, the pin members are inserted through the pin holes for replacing the dummy pins inserted in the pin holes.

According to the manufacture method of power transmission chain constituted as described above, the dummy pins are inserted into the pin holes for placing the link plates in layers, whereby the plural link plates may be maintained in the state temporarily assembled as the power transmission chain. Accordingly, the link plates placed in layers may be positioned as bringing the pin holes thereof into exact alignment. This ensures that the pin members are positively inserted through the pin holes of the link plates and hence, the fabrication of the power transmission chain is facilitated.

According to the invention, a manufacture method for manufacturing a power transmission chain including: a plurality of link plates possessing pin holes and placed in layers in a width-wise direction; and a plurality of pin members inserted through the pin holes for interconnecting the plural link plates is characterized in that the following steps are performed to assemble the link plates according to a predetermined array pattern, the steps including:

(a) a step of inserting dummy pins, which are removably insertable in the pin holes, into the pin holes for placing the link plates in layers thereby temporarily assembling the link plates to form the power transmission chain;

(b) a step of fixing the temporarily assembled link plates by clamping; and (c) a step of inserting the pin members through the pin holes for pushing out the dummy pins from the pin holes, thereby replacing the dummy pins in the pin holes with the pin members.

According to the invention, a manufacturing apparatus for manufacturing a power transmission chain including: a plurality of link plates possessing pin holes and placed in layers in a width-wise direction; and a plurality of pin members inserted through the pin holes for interconnecting the plural link plates, the apparatus comprises: first-end retaining means for retaining first ends of the plural pin members as arranging the pin members just as the pin members are assembled to form the power transmission chain; second-end retaining means for releasably retaining second ends of the plural pin members as maintaining axes of the pin members substantially in parallel to the width-wise direction of the power transmission chain to be fabricated and as allowing the link plates in a predetermined number of layers to be placed at the respective second ends of the pin member; and link-plate locating means for inserting the second ends of the pin members and slidably moving the link plates along the pin members, thereby locating the link plates at predetermined positions with respect to the width-wise direction of the power transmission chain.

According to the manufacturing apparatus for power transmission chain constituted as described above, an exact positional relation between the link plates and the pin members may be maintained during the insertion of the pin members into the pin holes of the link plates. This not only permits the pin members to be positively inserted through the pin holes of the link plates but also permits the link plates to be located at the predetermined positions. Thus, the fabrication of the power transmission chain is facilitated.

According to the above manufacturing apparatus for power transmission chain, the first-end retaining means may comprise a die (assembling die 5) formed with a plurality of positioning holes (positioning holes 5b) along a longitudinal direction of the power transmission chain in order to arrange the pin members just as the pin members are assembled to form the power transmission chain, the positioning holes receivingly retaining the first ends of the pin members. In this case, the plural pin members may be arranged just as they are assembled to form the power transmission chain.

According to the above manufacturing apparatus for power transmission chain, it is preferred that the plural positioning holes (positioning holes 5b) have an inner peripheral contour conforming to an outer peripheral contour of the pin members. In this case, the pin members may be retained assuredly.

According to the above manufacturing apparatus for power transmission chain, it is preferred that the plural positioning holes (positioning holes 5b) are designed to have a clearance for permitting the pin members to be smoothly inserted therein or removed therefrom. In this case, the pin members may be retained more assuredly.

According to the above manufacturing apparatus for power transmission chain, it is preferred that the second-end retaining means includes first and second retaining plates (retaining plate 8 and holding plate 9) for releasably clamping an outer periphery of the second end of the pin member having the first end thereof retained by the first-end retaining means, and wherein at least one of the retaining plates is formed with a notch at its retaining surface for retaining the pin member, the notch formed in conformity to an outer peripheral contour of the pin member.

In this case, the second ends of the pin members may be retained easily and assuredly.

According to the above manufacturing apparatus for power transmission chain, it is preferred that the link-plate locating means includes an upper die (upper die 7) which includes a contact surface (lower surface 7a) brought into contact with side surfaces of the link plates and through-holes (through-hole 7b) formed vertically to the contact surface and allowing the pin members retained by the first-end retaining means or the second-end retaining means to be inserted therethrough, and which presses the link plates in contact with the contact surface in the chain width-wise direction for locating the link plates at the predetermined positions and is free to move relative to the link plates in the chain longitudinal direction.

In this case, the link plates may be positively located at the pin members retained by the both retaining members.

According to the invention, a manufacturing apparatus for manufacturing a power transmission chain including: a plurality of link plates possessing pin holes and placed in layers in a width-wise direction; and a plurality of pin members inserted through the pin holes for interconnecting the plural link plates, the apparatus comprises: a retainer jig which receives the pin members therein for retaining the pin members at outside surfaces thereof and for arranging the pin members just as the pin members are assembled to form the power transmission chain; pin-member projecting means for projecting first ends of the pin members from the retainer jig; and link-plate locating means for slidably moving the link plates, mounted on the first ends of the pin members, along the pin members, thereby locating the link plates at predetermined positions with respect to the width-wise direction of the power transmission chain.

According to the manufacturing apparatus for power transmission chain constituted as described above, the exact positional relation between the link plates and the pin members may be maintained during the insertion of the pin members into the pin holes of the link plates. This not only permits the pin members to be assuredly inserted into the pin holes of the link plates but also permits the link plates to be located at the predetermined positions. Thus, the fabrication of the power transmission chain is facilitated.

The above manufacturing apparatus for power transmission chain may be constituted such that the retainer jig includes a die (assembling die body 17) which is formed with a horizontal upper surface (upper surface 17b) and which includes a plurality of positioning holes (17a) arranged in a longitudinal direction of the power transmission chain, the positioning holes extended from the upper surface to a lower surface of the die for receiving the pin members, designed to have a clearance for permitting the pin members to be smoothly inserted therein or removed therefrom and having an inner peripheral contour conforming to an outer peripheral contour of the pin members, and that the pin-member projecting means includes a stopper (stopper 18) having a plurality of stopper pins (stopper pins 18a) projected therefrom, the stopper pins vertically movably inserted into the plural positioning holes from the lower side of the die and pressing their upper end faces against lower end faces of the pin members inserted in the positioning holes thereby positioning the pin members with respect to the vertical direction, the pin-member projecting means vertically moving the stopper thereby projecting the pin members from the upper surface of the die.

According to the above manufacturing apparatus for power transmission chain, it is preferred that the die has a structure which can be vertically separated into at least two parts, one of which is removable for adjustment of the vertical height of the die. In this case, the die may be decreased in height while the vertical stroke of the die may be decreased. Thus, the manufacturing apparatus may achieve the size reduction and power saving.

According to the invention, a manufacturing apparatus for manufacturing a power transmission chain including: a plurality of link plates possessing pin holes and placed in layers in a width-wise direction; and a plurality of pin members inserted through the pin holes for interconnecting the plural link plates, the apparatus comprises: a plurality of dummy pins removably insertable in the pin holes; and dummy-pin retaining means for removably retaining the dummy pins as arranging the dummy pins just as the pin members assembled in the power transmission chain are arranged.

According to the manufacturing apparatus for power transmission chain constituted as described above, the link plates may be temporarily assembled by using the dummy pins and hence, the link plates so layered may be positioned as bringing the pin holes thereof into exact alignment. Since the dummy pins are removably retained by the dummy-pin retaining means, it is possible to replace the dummy pins with the pin members in the temporarily assembled state. Thus, the pin members may be positively inserted into the pin holes of the link plates and hence, the fabrication of the power transmission chain is facilitated.

According to the above manufacturing apparatus for power transmission chain, it is preferred that the dummy-pin retaining means includes: a die (assembling die 25) which is formed with a horizontal upper surface (upper surface 25b) and which includes a plurality of positioning holes (positioning holes 25a) arranged in a longitudinal direction of the power transmission chain, the positioning holes extended from the upper surface to a lower surface of the die for receiving the dummy pins, designed to have a clearance for permitting the dummy pins to be smoothly inserted therein or removed therefrom and having an inner peripheral contour conforming to an outer peripheral contour of the dummy pins; and springs (springs 25d) which bias the dummy pins upwardly for inserting the dummy pins in the positioning holes and projecting the dummy pins from the upper surface of the die when a downward force is applied to the dummy pins.

In this case, the temporary assembling of the link plates and the insertion of the pin members may be accomplished easily and assuredly.

According to the above manufacturing apparatus for power transmission chain, it is preferred that the dummy pin has an outside diametrical dimension defined to be 60 to 100 μm smaller than an outside diametrical dimension of the pin member. Such dimensions so defined permit the dummy pins to be easily inserted into or removed from the pin holes and to be reliably positioned when inserted into the pin holes.

BEST MODES FOR CARRYING OUT THE INVENTION

Figure 1:
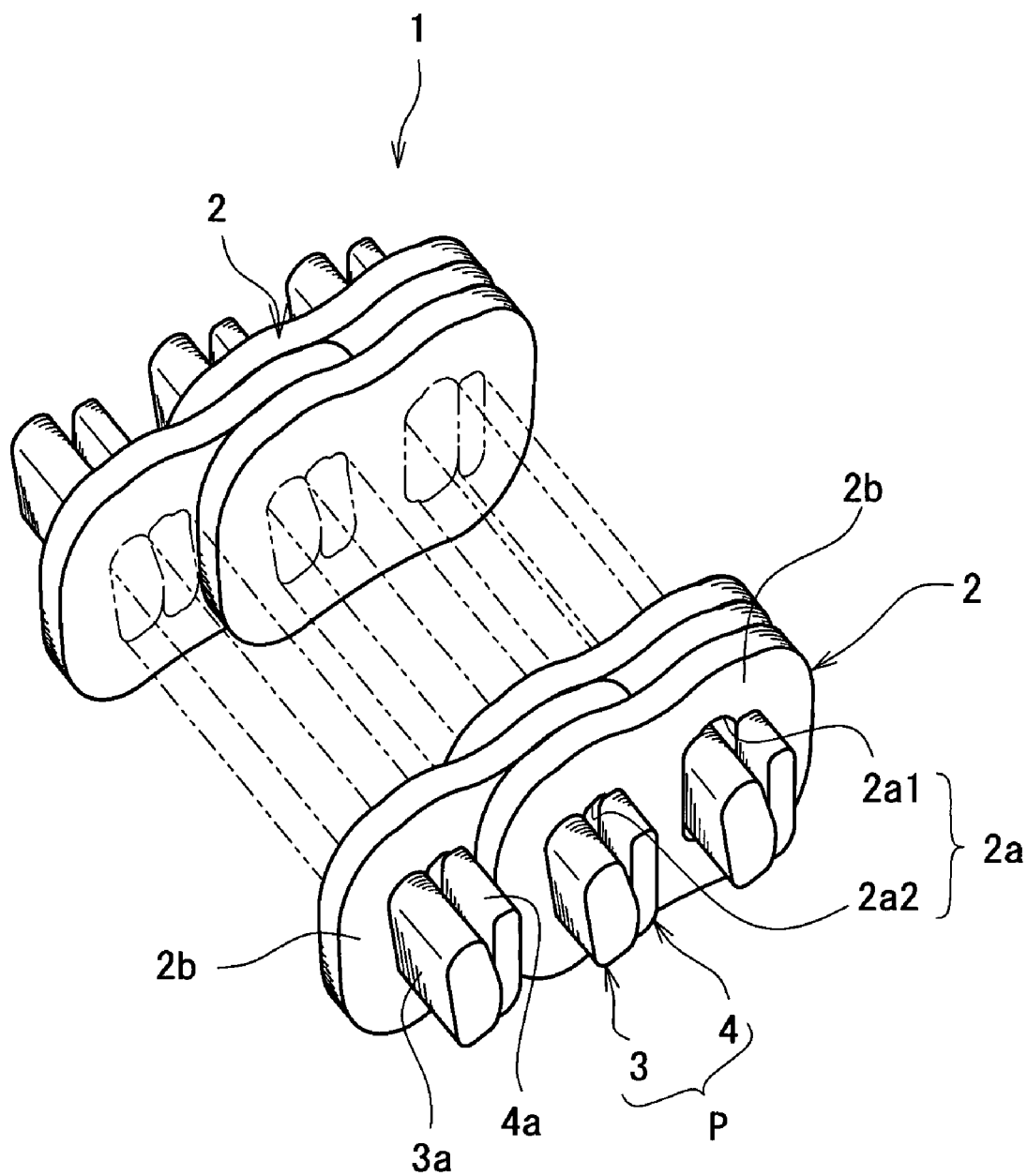
FIG. 1 is a perspective view showing a constitution of an essential part of a chain for use in chain-type continuously variable transmission, as one example of a power transmission chain manufactured according to the invention.

Preferred embodiments of the invention will be described with reference to the accompanying drawings. FIG. 1 is a perspective view schematically showing a constitution of an essential part of a chain (hereinafter, simply referred to as "chain") for use in a so-called chain-type continuously variable transmission, as one example of a power transmission chain manufactured according to the invention. The chain 1 includes: a plurality of link plates 2 formed from a metal (carbon steel or the like); and a plurality of pin members P formed from a metal (bearing steel or the like) and serving to interconnect the link plates 2. The chain has an endless loop form. FIG. 1 partially omits a width-wise intermediate portion of the chain 1.

The link plate 2 has a gently curved outline. All the link plates are so formed as to have substantially the same out line. The link plate is formed with a first pin hole 2a1 and a second pin hole 2a2. The first pin hole 2a1 and the second pin hole 2a2 are also collectively referred to as a pin hole 2a. As shown in the figure, the link plates are placed in layers in a width-wise direction. A respective pair of adjoining link plates 2 are arranged in a manner that the link plates are shifted from each other in a chain longitudinal direction so as to be partially overlapped with each other at side surfaces 2b thereof for establishing alignment between the first pin hole 2a of one link plate 2 with the second pin hole 2a of the other link plate and that the link plates are placed in layers in the width-wise direction of the chain.

The pin member P for interconnecting the link plates 2 includes: a pin 3 constituted by a bar-like body having an outside surface 3a conforming to an inside surface of the pin hole 2a; and a strip 4 (also called an inter-piece) constituted by a bar-like body which is formed slightly shorter than the pin 3 and has an outside surface 4a conforming to the inside surface of the pin hole 2a. The pin 3 and the strip 4 are press-inserted through the pin holes 2a of the link plates 2 placed in layers as described above, thereby bendably interconnecting the plural link plates 2.

Next, a detailed description is made on a manufacturing apparatus for the above chain 1 according to a first embodiment of the invention. FIG. 2 is a group of schematic diagrams showing the manufacturing apparatus for the chain 1 and a manufacture method of manufacturing the chain 1 by employing the apparatus.

Figure 2A:
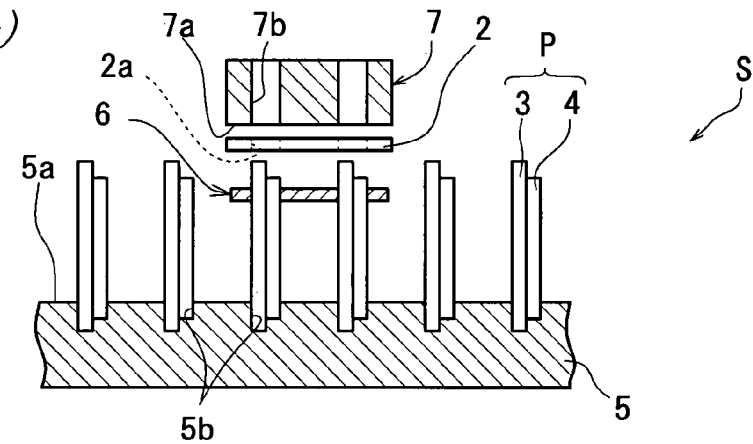
FIG. 2 is a group of schematic diagrams showing a chain manufacturing apparatus according to a first embodiment of the invention and a procedure of a chain manufacture method employing the apparatus.

As shown in FIG. 2(a), the manufacturing apparatus S for the chain 1 includes: an assembling die 5 for retaining plural pins 3 and strips 4 at respective lower ends thereof (as first ends thereof); a retainer jig 6 disposed upwardly of the assembling die 5 for retaining respective upper ends (as second ends) of the pins 3 and strips 4 retained by the assembling die 5; and an upper die 7 disposed upwardly of the assembling die 5 and the retainer jig 6 and moved downward together with the link plate 2 thereby press-inserting the retained pins 3 and strips 4 through the pin holes 2a of the link plate 2.

The assembling die 5 is a die formed in a rectangular solid shape by using a carbon tool steel, alloy tool steel or the like. The assembling die 5 receives the first ends of individual pairs of pins 3 and strips 4 in a plurality of positioning holes 5b formed in an upper surface 5a thereof, thereby retaining the individual pin-strip pairs in a substantially vertically upstanding position relative to the upper surface 5a. The assembling die is adapted for the arrangement of a required number of pins and strips for forming the chain 1. The positioning hole 5b is in the form of a closed-end hole. The positioning holes 5b in adjoining relation define the same pitch width as a pitch width of the chain 1. The positioning holes 5b are arranged in a line along a longitudinal direction of the assembling die 5 so as to be able to retain the required number of pins 3 and strips 4 for forming the chain 1. The positioning hole 5b has its inside surface so configured as to conform to an outer peripheral contour defined by the pair of inserted pin 3 and strip 4 assembled in the chain 1. The positioning hole 5b is adapted to position the paired pin 3 and strip 4 as matching the outer peripheral contour thereof with an inner peripheral contour of the pin hole 2a, such that the pin 3 and strip 4 inserted in the positioning hole 5b may be press-inserted into the pin hole 2a of the link plate 2. A clearance between the positioning hole 5b and the pin 3 and strip 4 inserted therein is defined to be large enough to permit the pin-strip pair to be smoothly inserted into or removed from the positioning hole but small enough to obviate the free play such as backlash of the pin and strip.

The positioning hole 5b is formed with a step at a bottom surface thereof. The step is adapted to position the pin 3 and the strip 4 with respect to an axial direction such that the pin 3 and the strip 4 having different axial lengths may have the same axial positional relation as that of the pin and strip assembled in the chain 1.

The positioning hole 5b has its depths defined to be equal to lengths by which the pin 3 and the strip 4 project from the link plate 2 disposed at the outermost side of the chain 1. This constitution provides an advantage that a link plate 2 press-mounted on the pin 3 and the strip 4 may be located at the outermost side of the chain 1 by moving the link plate 2 to a position to make contact against the upper surface 5a of the assembling die 5. Namely, the upper surface 5a may serve as a reference surface based on which the link plates 2 are located.

Such an assembling die 5 constitutes lower-end retaining means (first-end retaining means) for retaining the lower ends of the plural pins 3 and strips 4 as arranging the pins 3 and the strips 4 just as they are assembled in the chain 1.

Figure 3A:
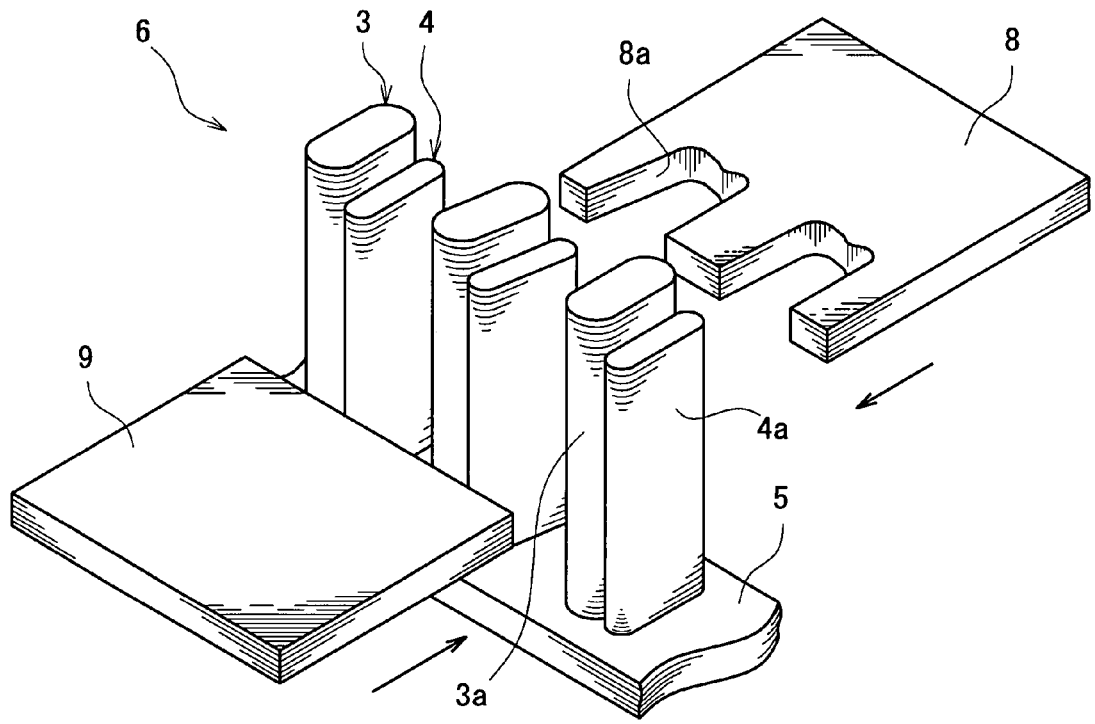
FIG. 3(a) is a perspective view showing a retainer jig shown in FIG. 2, FIG. 3(b) showing, in perspective view, pins and strips retained by the retainer jig.
Figure 3B:
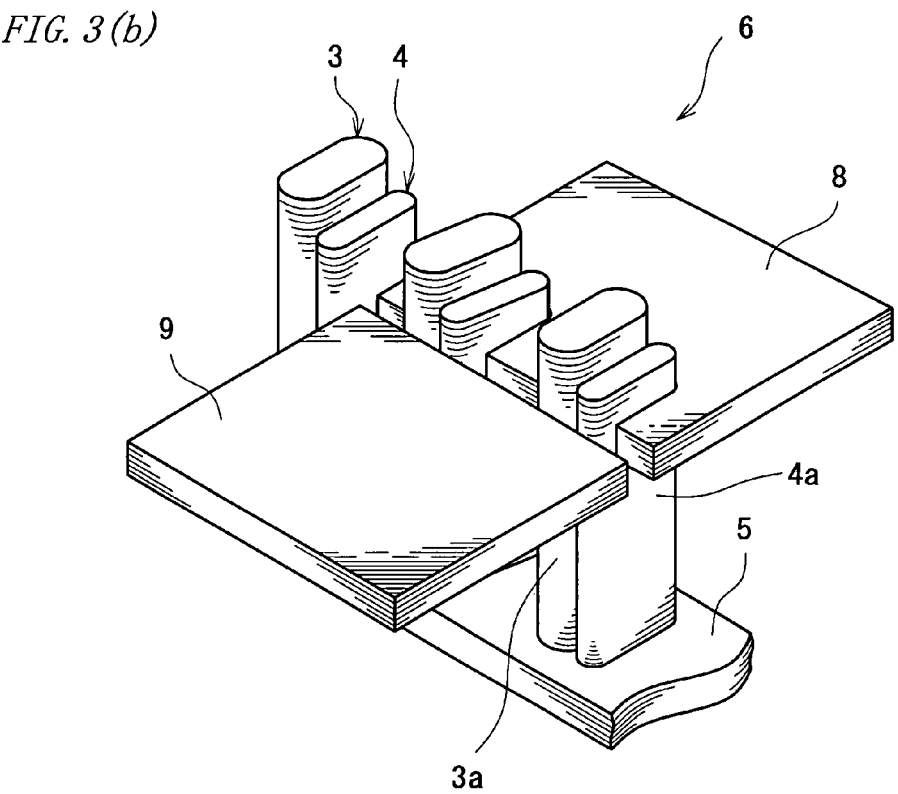

The retainer jig 6 serves to retain the upper ends of the pins 3 and the strips 4 retained by the assembling die 5, as described above. As shown in FIG. 3, the retainer jig 6 includes: a retaining plate 8 (first retaining plate) formed from an alloy tool steel and having a notch 8a formed in conformity to the outer peripheral contour of the paired pin 3 and strip 4; and a holding plate 9 (second retaining plate) formed in a square shape by using the alloy tool steel. These plates are mounted to unillustrated hydraulic chucks or the like so as to be movable in directions of arrows in the figure. FIG. 3(a) shows a state where the pins and strips are released from the retained state. In this state, the retaining plate 8 and the holding plate 9 are located at places spaced far enough from the pins 3 and the strips 4 to be out of contact with the lowered upper die 7. The pins 3 and the strips 4 are retained as follows. As shown in FIG. 3(b), the pins 3 and the strips 4 are fitted in the notches 8a of the retaining plate 8 so as to be positioned substantially vertically to the upper surface 5b of the assembling die 5, while the outside surfaces 3a, 4a of the upper ends of the pins 3 and strips 4 are clamped by means of the holding plate 9. Thus, the retainer jig 6 in combination with the unillustrated hydraulic chucks for moving the retainer jig 6 constitute upper-end retaining means (second-end retaining means) for releasably retaining the upper ends of the pins 3 and the strips 4.

In this process, the retainer jig 6 is set at a height to retain the pins 3 and the strips 4 at places some distances downward from upper end faces of the pins 3 and the strips 4 in order to permit one link plate layer 2 to be mounted on the upper ends of the pins 3 and strips 4, as shown in FIG. 2 and FIG. 3. While the embodiment is constituted to press-mount one link plate layer on the upper ends of the pins 3 and strips 4, an alternative constitution may be made to press-mount plural link plate layers, as needed.

Returning to FIG. 2, the upper die 7 (die on the upper side) is formed in a rectangular solid shape by using a carbon tool steel, alloy tool steel or the like. The upper die 7 with its lower surface 7a pressed against the link plate 2 is moved down so as to press-insert the pins 3 and strips 4 through the pin holes 2a of the link plate 2. Thus, the link plates 2 may be placed in plural layers. The upper die 7 is formed with a plurality of through-holes 7b open to the pins 3 and strips 4 in order to allow the pins 3 and strips 4 to penetrate therethrough, the pins and strips projecting from the pin holes 2a of the link plate 2 when the upper die 7 is moved down for press-mounting the link plate 2 thereon. This permits the upper die 7 to mount the link plate 2 on the pins 3 and strips 4 at a position of an arbitrary height from the upper surface 5b of the assembling die 5, the pins 3 and strips 4 upstanding from the upper surface of the assembling die.

The aforementioned assembling die 5 and the upper die 7 are mounted to an unillustrated pressing machine or the like. The pressing machine may be so operated as to reciprocate these dies vertically in respective arbitrary ranges of the strokes of the dies as maintaining these dies in parallel to each other. The pressing machine may also be operated to fix the respective dies at any positions in the above strokes.

The upper die 7 is designed to be constantly positioned upwardly of the pins 3 and strips 4 retained by the retainer jig 6. The assembling die 5 is movable relative to the upper die 7 and the retainer jig 6 in the longitudinal direction of the chain 1, so as to allow the upper die 7 to be located upwardly of any of the all pins 3 and strips 4 arranged on the assembling die 5. This provides for the placement of the link plates across the longitudinal range of the chain 1.

Such an upper die 7 in combination with the unillustrated pressing machine constitute link-plate locating means which press-inserts the pins 3 and strips 4 through the link plate 2 and slidably moves the press-mounted link plate 2 along the pins 3 and strips 4 for locating the link plate 2 at a predetermined position with respect to the width-wise direction of the chain 1.

Next, description is made on a method of manufacturing the chain 1 by using this manufacturing apparatus S for the chain 1.

The chain 1 is fabricated as follows. First, each paired pin 3 and strip 4 are retained substantially vertically to the upper surface 5a by inserting the first ends thereof in each positioning hole 5b, as shown in FIG. 2(a). Thus, a required number of pins 3 and strips 4 for forming the chain 1 are arranged. In this manner, the pins 3 and strips 4 have their first ends retained by the assembling die 5, whereby the pins 3 and strips 4 are arranged just as they are assembled to form the chain 1.

Out of the pins 3 and strips 4 arranged on the assembling die 5, two paired pins 3 and strips 4 to be simultaneously press-inserted through one link plate 2 have their upper ends, as the second ends, retained by the retainer jig 6 in a manner that axes of the pins and strips are directed substantially vertically to the upper surface 5a. That is, the retainer jig 6 retains the upper ends of the pins 3 and strips 4 thereby directing the axes of the pins 3 and strips 4 substantially parallel to the width-wise direction of the chain 1 to be fabricated and positioning the two pin members P with the pitch width.

Figure 2B:
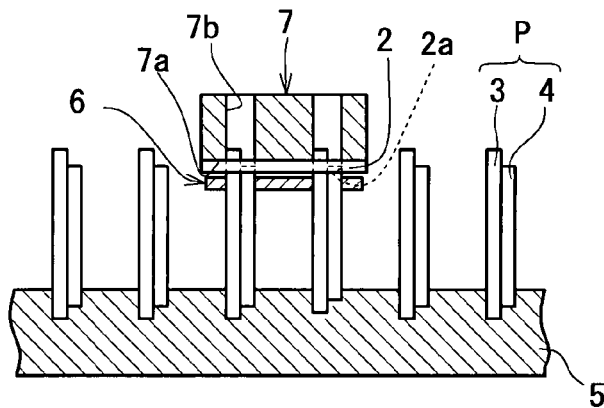

Subsequently, a jig or the like (not shown) is used for retaining one link plate 2 as aligning the pin holes 2a with the upper ends of the pins 3 and strips 4, as shown in FIG. 2(b). The link plate 2 is brought into contact against the lower surface 7a of the upper die 7 disposed upwardly of the assembling die 5. The upper die 7 is progressively moved down to press-insert the pins 3 and strips 4 through the pin holes 2a of the link plate 2 from the upper end side. The link plate 2 is pressed down to be located directly above the retainer jig 6. In this embodiment, a single link plate 2 is press-mounted on the pins and strips. As needed, however, the link plates in plural layers may be press-mounted.

In this embodiment, the jig is used for retaining the link plate 2 and aligning the pin holes 2a thereof with the upper ends of the pins 3 and strips 4. Alternatively, the link plate 2 may also be retained by temporarily engaging the link plate with the upper ends of the pins 3 and strips 4 whereby the pin holes 2a of the link plate are aligned with the upper ends of the pins 3 and strips 4 before the upper die 7 is operated to press-mount the link plate on the pins and strips. The link plate 2 may be temporarily engaged with the upper ends of the pins 3 and strips 4 by, for example, slightly press-inserting or inserting the pins 3 and strips 4 into the pin holes 2a.

Figure 2C:
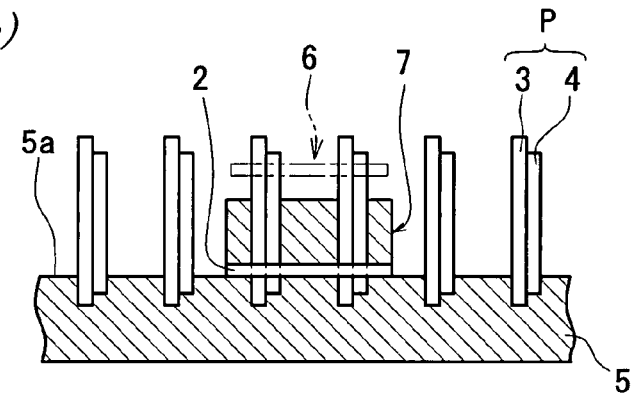

Next, the pins 3 and strips 4 are released from the retainer jig 6, while the upper die 7 is moved down further thereby slidably moving the link plate 2 along the pins 3 and strips 4 to a position where the link plate 2 is in contact against the upper surface 5a of the assembling die 5, as shown in FIG. 2(c). The link plate 2 thus moved to the position to make contact against the upper surface 5a defines the aforesaid link plate located at the predetermined position with respect to the width-wise direction of the chain 1 or at the outermost side of the chain 1 with respect to the width-wise direction.

Figure 2D:
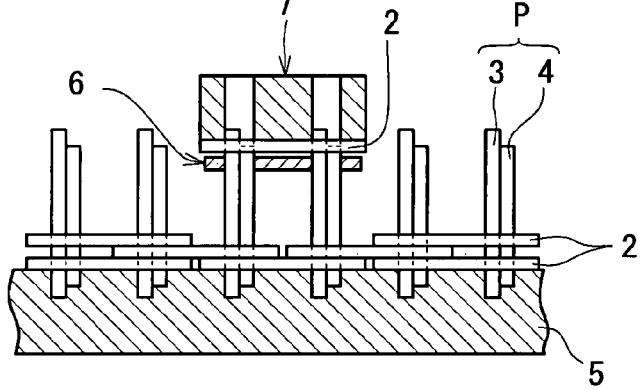

Then, as shown in FIG. 2(d), the aforementioned procedure is repeated by operating the assembling die 5, the retainer jig 6 and the upper die 7. Based on the link plates 2 making contact against the upper surface 5a, the link plates 2 are sequentially placed in layers in the longitudinal and width-wise directions of the chain 1 according to a predetermined array pattern, whereby the link plates are assembled to form the chain 1.

If a certain number of link plates 2 are press-mounted on the pins 3 and strips 4 and placed in layers so that the pins 3 and strips 4 may be retained in position without using the retainer jig 6, then the step of retaining the pins 3 and strips 4 by means of the retainer jig 6 and the step of releasing the pins and strips from the retainer 6 may be omitted.

According to the embodiment as described above, the upper ends of the pins 3 and strips 4 are releasably retained by the retainer jig 6 even when the link plate 2 is press-mounted on the pins and strips from the upper end side. Hence, the link plate 2 may be slidably moved in the axial direction of the pins 3 by releasing the pins and strips from the retainer jig. Thus, the link plate 2 may be located at the predetermined position with respect to the width-wise direction of the chain 1.

Since one link plate 2 (one layer) is located at the predetermined position at a time, contact surface pressure between adjoining link plates 2 may be adjusted properly. This is effective to prevent a problem that the contact surface pressure between the link plates 2 adjoining in the width-wise direction of the chain 1 is increased so much that a friction drag between these link plates is increased. Therefore, the chain 1 is prevented from suffering the decrease of power transmission efficiency which results from the increase of flexion torque associated with the increased friction drag between the link plates.

Thus, the chain 1 having a linear form may be assembled by placing the link plates 2 at the pin members P arranged in one line. The chain 1 having the endless loop form may be obtained by interconnecting the opposite ends of the chain 1 thus assembled in the linear form.

The manufacture method of the chain 1 according to the above embodiment is adapted to exactly maintain the positional relation between the link plates 2 and the pins 3/strips 4 because the plural pins 3 and strips 4 arranged just as they are assembled in the chain 1 have their lower ends and upper ends retained by the assembling die 5 and the retainer jig 6. Therefore, the pins 3 and strips 4 may be assuredly press-inserted through the pin holes 2a of the link plates 2 so that the fabrication of the chain 1 is facilitated.

On the other hand, the apparatus S for manufacturing the chain 1 according to the embodiment is adapted to fabricate the chain 1 based on the aforementioned method, thus providing an easy fabrication of the chain 1.

According to the embodiment, two sets of pin members P are retained by the retainer jig 6, while one link plate 2 is press-mounted on these pin members at a time. Alternatively, the chain 1 may also be fabricated by retaining more than two sets of pin members P or the total number of pin members P at a time, and by simultaneously press-mounting plural link plates to be placed in the same layer of the chain 1 or simultaneously press-mounting all the link plates to be placed in the longitudinal direction of the chain 1.

According to the retainer 6 of the embodiment, only the retaining plate 8 is formed with the notch in conformity to the outer peripheral contour of the pin 3 and strip 4. However, the notches may be formed in both of the retaining plate 8 and the holding plate 9.

Next, a detailed description is made on a manufacturing apparatus for the above chain 1 according to a second embodiment of the invention. FIG. 4 is a group of schematic diagrams showing a manufacturing apparatus for the chain 1 and a manufacture method of the chain 1 employing the apparatus.

Figure 4A:
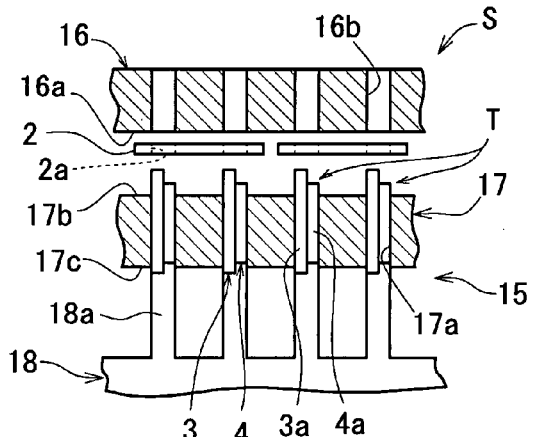
FIG. 4 is a group of schematic diagrams showing a chain manufacturing apparatus according to a second embodiment of the invention and a procedure of a chain manufacture method employing the apparatus.

As shown in FIG. 4(a), the manufacturing apparatus S for chain 1 according to the embodiment includes: an assembling die 15 for retaining plural pins 3 and strips 4 at the outside surfaces 3a, 4a thereof; and an upper die 16 disposed upwardly of the assembling die 15 and moved downward together with the link plates 2 thereby press-inserting the retained pins 3 and strips 4 through the pin holes 2a of the link plates 2.

The assembling die 15 includes: an assembling die body 17 having a rectangular solid shape and formed with a plurality of positioning holes 17a for retaining the outside surfaces 3a, 4a of the pins 3 and strips 4 by receiving the pins and strips; and a stopper 18 including a plurality of stopper pins 18a inserted into the respective positioning holes 17a.

The assembling die body 17 is a die formed from, for example, a carbon tool steel, alloy tool steel or the like. In the assembling die body, the above positioning holes 17a are formed vertically to an upper surface 17b thereof for communicating the upper surface 17b with a lower surface 17c thereof.

The positioning holes 17a are arranged in a line with the same pitch width as that of the chain 1, the pitch width defined between a respective pair of adjoining positioning holes 17a, such that a required number of pins 3 and strips 4 for forming the chain 1 may be retained along a longitudinal direction of the assembling die 15. An inside surface of the positioning hole 17a is so configured as to conform to an outer peripheral contour defined by the paired pin 3 and strip 4 inserted therein to be assembled in the chain 1, and so configured as to coincide with an inner peripheral contour of the pin hole 2a of the link plate 2 located at place to form the chain 1. This constitution permits the pin 3 and strip 4 inserted in the positioning hole 17a to be so positioned as to be press-inserted through the pin hole 2a of the link plate 2. A clearance defined between the inserted pin 3/strip 4 and the positioning hole 17a is defined to be large enough to provide smooth insertion/removal of the pin and strip but small enough to obviate the free play such as backlash of the pin and strip.

Each of the positioning holes 17a allows the aforesaid stopper pin 18a to be inserted from a lower side thereof. The stopper pin 18a is formed from a carbon tool steel, alloy tool steel or the like and is projected integrally from the stopper 18 disposed downwardly of the assembling die body 17. A tip end of the stopper pin 18a is pressed against lower ends of the pin 3 and strip 4 inserted in the positioning hole 17a, so as position the pin 3 and strip 4 in the positioning hole 17a with respect to the vertical direction.

The stopper 18 is mounted to the unillustrated pressing machine along with the assembling die 17 and the upper die 16. The stopper 18 is adapted to be moved up or down as maintaining a parallel relation with the assembling die body 17 and to be fixed at place. Thus, the stopper pins 18a inserted in the respective positioning holes 17a may be moved up or down and may also be fixed at places. Accordingly, the stopper pins 18a (stopper 18) may be fixed to place relative to the assembling die body 17 in a manner to fix the pins 3/strips 4 inserted in the positioning holes 17a at an arbitrary vertical position in the positioning holes 17a thereby permitting the upper ends as the first ends of the pins 3 and strips 4 to define projection portions T (to be described hereinlater) projected from the upper surface 17b by a predetermined height.

Thus, the stopper pins 18a (stopper 18) in combination with the unillustrated pressing machine constitute pin-member projecting means for projecting the upper ends of the pins 3 and strips 4 from the upper surface 17b.

The tip end of the stopper pin 18a is formed with a step such that the lower end of the pin 3 may be located slightly downwardly of the lower end of the strip 4. When pressed against the pin 3 and the strip 4, therefore, the stopper pin 18a is capable of axially positioning the pin 3 and strip 4 having the different axial lengths in a manner that the axial positional relation between the pin 3 and the strip 4 may be the same as that of the pin 3 and strip 4 assembled in the chain 1.

Such an assembling die 15 in combination with the unillustrated pressing machine constitute a retainer jig which retains the plural pins 3 and strips 4 at the outside surfaces 3a, 4a thereof by receiving the pins and strips in the positioning holes 17a and which arranges the pins 3 and strips 4 just as the pins and strips are assembled in the chain 1.

The upper die 16 is formed in a rectangular solid shape by using a carbon tool steel, alloy tool steel or the like. The upper die 16 with its lower surface 16a pressed against the link plates 2 is moved down to press-insert the pins 3 and strips 4 through the pin holes 2a of the link plates 2, thereby placing the link plates 2 in plural layers. The upper die 16 is further formed with is formed with a plurality of through-holes 16b open to the pins 3 and strips 4 in order to allow the pins 3 and strips 4 to penetrate therethrough, the pins and strips projecting from the pin holes 2a of the link plates 2 when the upper die 16 is moved down for press-mounting the link plates 2 thereon.

As described above, the upper die 16 is mounted to the unillustrated pressing machine along with the assembling die body 17 and the stopper 18. The pressing machine may be so operated as to reciprocate these dies vertically in respective arbitrary ranges of the strokes of the dies as maintaining these dies in parallel to each other. The pressing machine may also be operated to fix the respective dies at any position in the above range.

Such an upper die 16 in combination with the unillustrated pressing machine constitute the link-plate locating means which slidably moves the link plates 2, press-mounted on the pins 3 and strips 4, along the pins 3 and strips 4 for locating the link plates 2 at predetermined positions with respect to the width-wise direction of the chain 1.

Next, description is made on a manufacture method of the chain 1 employing this manufacturing apparatus S for the chain 1.

The chain 1 is fabricated as follows. First, a required number of pins 3 and strips 4 for forming the chain 1 are arranged by inserting the pins 3/strips 4 through the positioning holes 17a of the assembling die body 17, as shown in FIG. 4(a).

Thus, the pins 3 and strips 4 are retained by the positioning holes 17a at their outside surfaces 3a, 4a and are arranged just as they are assembled in the chain 1.

Subsequently, the stopper pins 18a (stopper 18) are fixed to place relative to the assembling die 15 in a manner that the upper ends of the pins 3 and strips 4 project from the upper surface 17b to define the projection portions T. In this embodiment, the projection portions T are projected by a length required for placing one layer of link plates, out of a predetermined number of link-plate layers placed in the width-wise of the chain 1.

As required, the projection portion T may have such a projection height as to permit the placement of plural link-plate layers. However, it is preferred that the projection height of the projection portion T is as small as possible (the minimum length required for placing one layer of link plates). The reason is that the smaller projection height leaves the greater length of the pin 3 and strip 4 inserted in the positioning hole 17a so that the outside surfaces 3a, 4a of the pin and strip are increased in the area retained by the assembling die 15. Hence, the pin 3 and strip 4 may be retained more assuredly.

Next, a jig (not shown) or the like is used for retaining one layer of link plates 2 as aligning the pin holes 2a with the upper ends of the pins 3 and the strips 4. The upper die 16 with its lower surface 16a pressed against the link plates is progressively moved down. Thus, the upper ends of the pins 3 and strips 4 retained by the assembling die 15 are press-inserted through the pin holes 2a of the link plates 2. As shown in FIG. 4(b), the link plates 2 thus press-mounted are slidably moved along the pins 3 and strips 4 so as to be located at positions to make contact with the upper surface 17b of the assembling die body 17. In this manner, these link plates 2 are located at the projection portions T.

In this embodiment, the jig is used for retaining the link plates 2 and aligning the pin holes 2a thereof with the upper ends of the pins 3 and strips 4 for press-insertion. Alternatively, the link plates 2 may also be retained by temporarily engaging the link plates with the upper ends of the pins 3 and strips 4 whereby the pin holes 2a of the link plates are aligned with the upper ends of the pins 3 and strips 4 before the upper die 16 is operated to press-mount the link plates on the pins and strips. The link plates 2 may be temporarily engaged with the upper ends of the pins 3 and strips 4 by, for example, slightly press-inserting or inserting the pins 3 and strips 4 into the pin holes 2a.

Figure 4E:
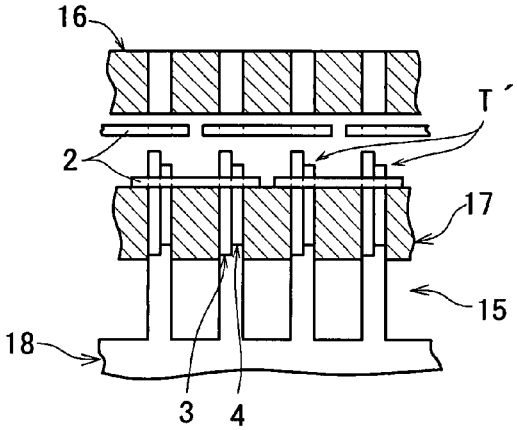
Figure 4B:
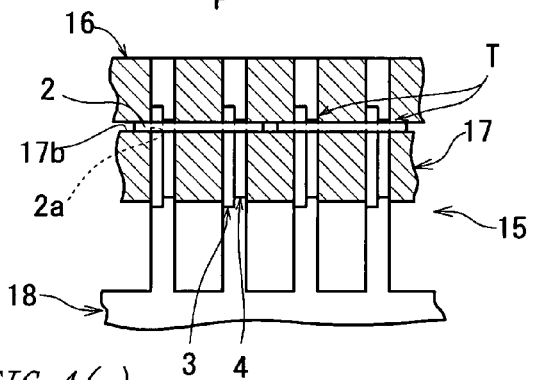
Figure 4F:
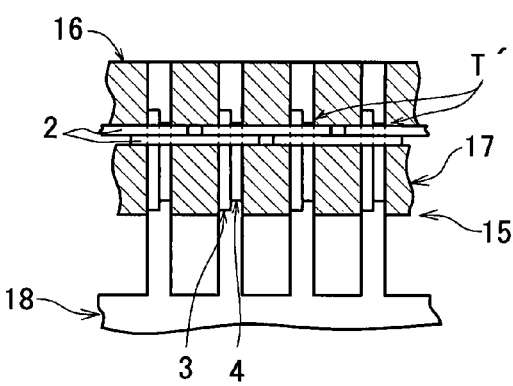
Figure 4C:
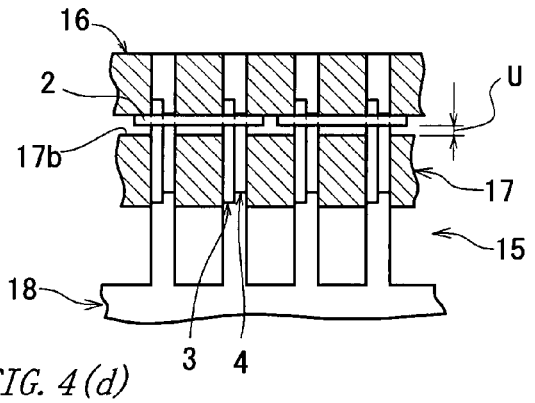

Subsequently, as shown in FIG. 4(c), only the stopper pins 18a (stopper 18) are moved up so as to provide a clearance U equivalent to the thickness of one layer of link plates 2 between the link plates so placed and the upper surface 17b, whereby the upper ends of the pins 3 and strips 4 are projected relative to the upper surface 17b. As shown in FIG. 4(d), the upper die 16 at the position shown in FIG. 4(c) is pressed down further for slidably moving the link plates 2 along the pins 3 and strips 4, thereby locating the link plates at positions to make contact with the upper surface 17b of the assembling die body 17.

When the upper die 16 is moved upward, as shown in FIG. 4(e), the upper ends of the pins 3 and strips 4 project from the pin holes 2a of the link plates 2 to define projection portions T'. At this time, the projection portions T' project by a length required for placing one layer of link plates 2 with respect to the width-wise direction of the chain 1.

Subsequently, as shown in FIG. 4(f), one layer of link plates 2 are placed at the projection portions T' to be layered further. The above procedure of forming the projection portions T' by using the assembling die 15 and the lower die 6 and then placing one layer of link plates 2 at the projection portions is repeated, thereby sequentially placing the link plates 2 in layers in the longitudinal and width-wise directions of the chain 1 and according to the predetermined array pattern. Thus, the link plates are assembled to form the chain 1.

According to the embodiment, one layer of link plates 2 are placed at the projection portions T, T' for layering. However, in a case where the projection portion T, T' has a projection height to permit the placement of plural layers of link plates, the plural layers of link plates may be placed at a time.

Thus, the chain 1 having the linear form may be assembled by placing the link plates 2 at the pin members P arranged in one line by means of the assembling die 15. The chain 1 having the endless loop form may be obtained by interconnecting the opposite ends of the chain 1 in the linear form.

In the above method of manufacturing the chain 1 according to the embodiment, the assembling die 15 retains the outside surfaces 3a, 4a of the plural pins 3 and strips 4 arranged just as they are assembled in the chain 1, so that the pins 3 and strips 4 may be positioned exactly. This permits the pins 3 and strips 4 to be assuredly press-inserted through the pin holes 2a of the link plates 2 and hence, the fabrication of the chain 1 is facilitated.

Figure 4G:
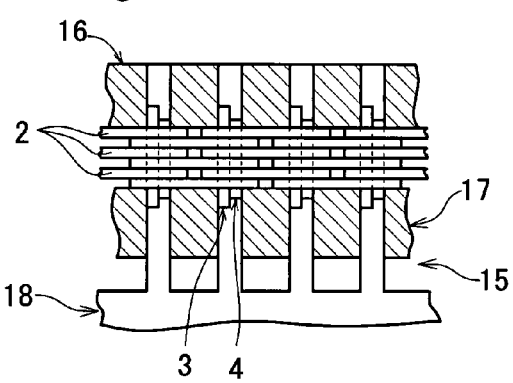
Figure 4D:
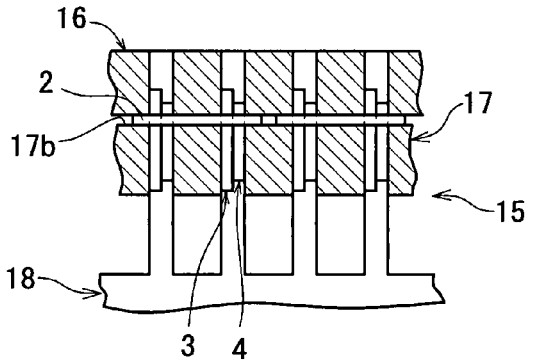

As the link plates 2 are sequentially placed in increased layers, as shown in FIG. 4(g), the pins 3 and strips 4 are increased in the amount of projection from the assembling die 15. Therefore, the outside surfaces 3a, 4a of the pins 3 and strips 4 are decreased in the area retained by the assembling die 15. On the other hand, the outside surfaces 3a, 4a of the pins 3 and strips 4 are retained by the pin holes 2a of the link plates 2 placed in layers on the upper surface 17b so that the pins 3 and strips 4 may be maintained in the exactly positioned state.

The apparatus S for manufacturing the chain 1 according to the embodiment is adapted to fabricate the chain 1 according to the aforementioned method and hence, the fabrication of the chain 1 is facilitated.

Next, another manufacture method employing the manufacturing apparatus S of the second embodiment is described with reference to FIG. 5. In the manufacture method illustrated by FIG. 4, one layer of link plates 2 are placed at a time, the placement of the link plates started from the first ends of the pins. However, the manufacture method illustrated by FIG. 5 differs from the above method in the following point. That is, three link-plate layers, out of the total number of link-plate layers, are first placed at predetermined positions corresponding to those of the link plates assembled in the chain 1. Subsequently, one layer of link plates, out of the total number of link-plate layers, are sequentially placed at the predetermined positions corresponding to those of the link plates assembled in the chain 1.

Figure 5A:
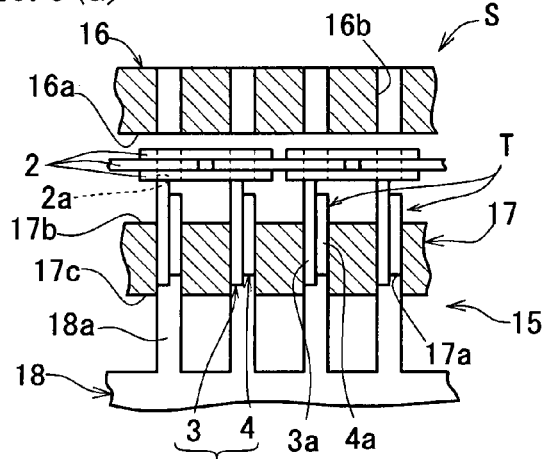
FIG. 5 is a group of schematic diagrams showing a procedure of another manufacture method, the procedure differing from the procedure shown in FIG. 4.

First, as shown in FIG. 5(a), the pins 3 and strips 4 are inserted in the positioning holes 17a of the assembling die 15 whereby the pins and strips are retained as arranged just as they are assembled in the chain 1. At this time, the pins 3 and strips 4 are retained in a manner that the upper ends as the first ends of the pins 3 and strips 4 project to define the projection portions T, as shown in the figure. In this case, the projection portions T are projected by a length required for placing three layers of link plates 2 in the width-wise direction of the chain 1.

Next, a jig (not shown) or the like is used for retaining the three layers of link plates 2 as aligning the pin holes 2a with the upper ends of the pins 3 and strips 4 according to the predetermined array pattern. The upper die 16 with its lower surface 16a pressed against the link plates 2 is progressively moved down. Thus, the upper ends of the pins 3 and strips 4 retained by the assembling die 15 are press-inserted through the pin holes 2a of the link plates 2. As shown in FIG. 5(b), the link plates 2 thus press-mounted are slidably moved along the pins 3 and strips 4 to positions where the link plates 2 in the lowermost layer make contact against the upper surface 17b of the assembling die body 17. In this manner, these link plates 2 are located at the projection portions T.

Figure 5E:
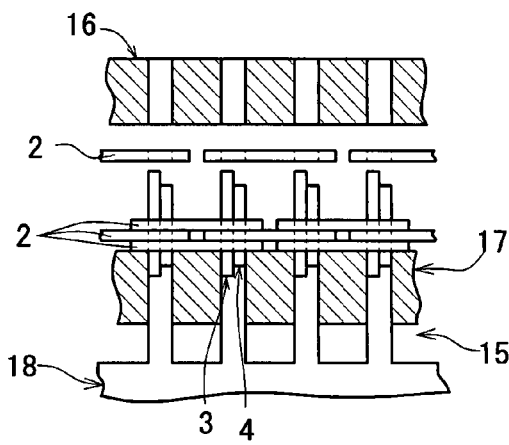
Figure 5B:
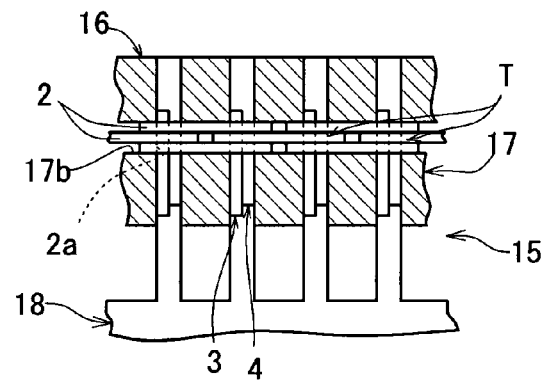
Figure 5F:
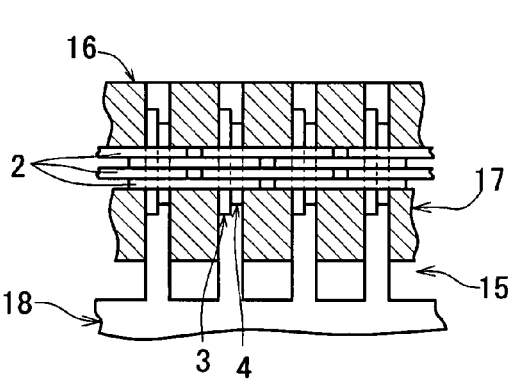
Figure 5C:
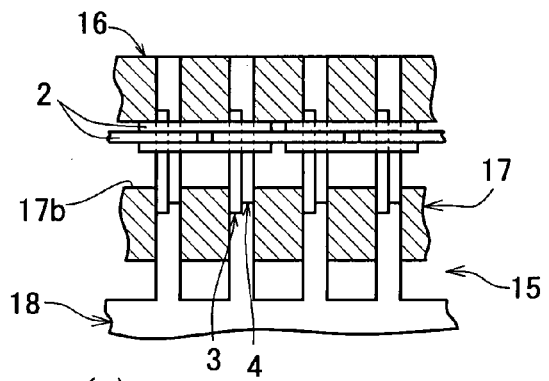

Next, only the assembling die body 17 is moved down and fixed to place, as shown in FIG. 5(c). At this time, the assembling die body 17 is lowered and fixed to place such that lengths of the lower ends of the pins 3 and strips 4 inserted in the positioning holes 17a are equal to lengths by which the pins 3 and strips 4 are projected from the link plates 2 located at the outermost positions of the chain 1.

In this approach, the link plates 2 may be located at the outermost positions as predetermined positions of the link plates 2 assembled in the chain 1 by placing the link plates at the positions to make contact against the upper surface 17b of the assembling die 15. That is, the upper surface 17b may be used as the reference surface based on which the link plates 2 are located. In this process, the assembling die 15 continues retaining the pins 3 and strips 4 because the lower ends of the pins 3 and strips 4 are inserted in the positioning holes 17a.

Figure 5D:
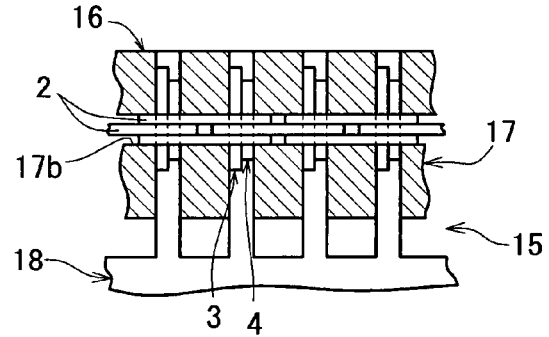
Figure 6A:
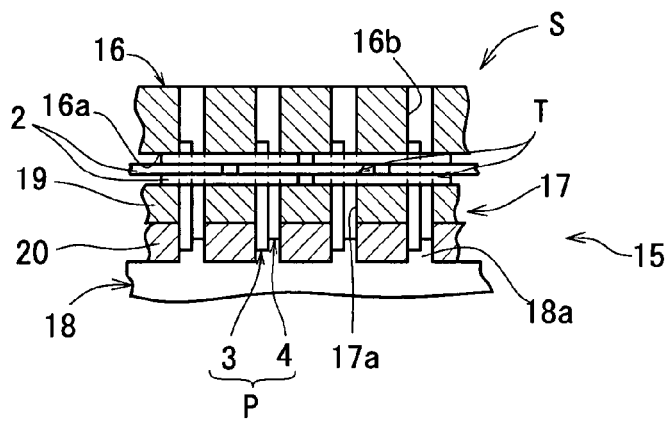
FIG. 6 is a group of schematic diagrams showing a modification of the chain manufacturing apparatus of the second embodiment hereof wherein an assembling die body has a separable structure, and showing an exemplary procedure of a chain manufacture method employing the apparatus.
Figure 6B:
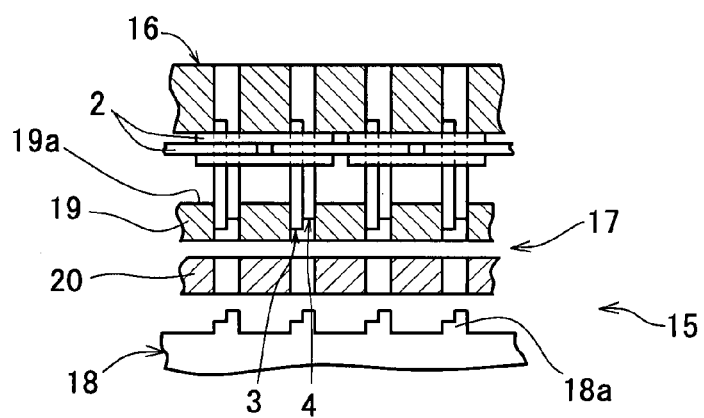
Figure 6C:
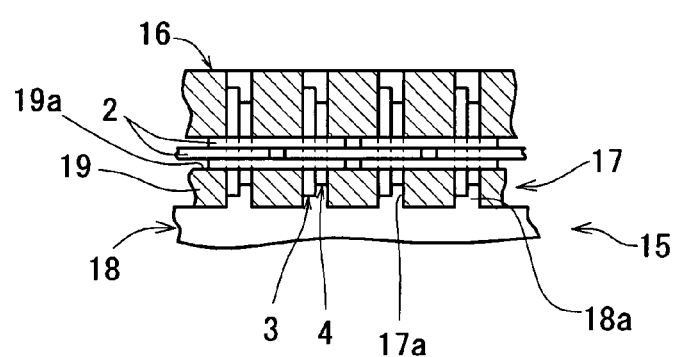
Figure 6D:
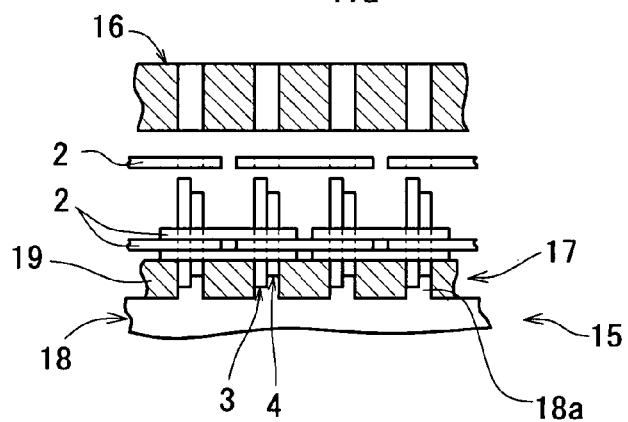

Subsequently, as shown in FIG. 5(d), the upper die 16 is further lowered from the position shown in FIG. 5(c) for slidably moving the link plates 2 in the lowermost layer along the pins 3 and strips 4 to positions to make contact against the upper surface 17b of the assembling die 15. At this time, the link plates in the lowermost layer are located at the positions equivalent to the predetermined positions thereof when assembled in the chain 1, as described above. That is, these link plates 2 define the link plates 2 located at the outermost positions in the width-wise direction of the chain 1. Based on these link plates, the link plates 2 forming the other layers are located at predetermined positions in the width-wise direction of the chain 1.

Subsequently, the upper die 16 is moved upward as shown in FIG. 5(e). Then, another layer of link plates 2 are press-mounted on the upper ends of the pins 3 and strips 4 and are slidably moved along the pins 3 and strips 4 so as to be located at positions equivalent to predetermined positions thereof in the width-wise direction of the chain when the link plates are assembled in the chain 1, as shown in FIG. 5(f). Thereafter, the above procedure is repeated for sequentially placing the link plates in layers according to the predetermined array pattern, whereby the link plates are assembled to form the chain 1.

Thus, the chain 1 having the linear form may be assembled by placing the link plates 2 at the pin members P arranged in one line by means of the assembling die 15. The chain 1 in the endless loop form may be obtained by interconnecting the opposite ends of the chain 1 in the linear form.

According to the manufacture method of the chain 1 illustrated by FIG. 5, the pins 3 and strips 4 may be positioned exactly because the pins 3 and strips 4 have their outside surfaces 3a, 4a retained by the assembling die 15 while the outside surfaces 3a, 4a of the pins 3 and strips 4 are also retained by the pin holes 2 of the three layers of link plates 2 initially placed at the predetermined positions. This ensures that the link plates subsequently placed permit the pins 3 and strips 4 to be press-inserted through the pin holes 2a thereof. Thus, the fabrication of the chain 1 is facilitated.

After the initial three layers of link plates 2 are placed at positions, the link plates 2 may be placed at predetermined positions on a per-layer basis. Hence, the contact surface pressure between the link plates 2 adjoining in the width-wise direction of the chain 1 may be adjusted properly. This is effective to prevent a problem that the contact surface pressure between the adjoining link plates 2 is increased so much that a friction drag between these link plates is increased. Therefore, the chain 1 is prevented from suffering the decrease of power transmission efficiency which results from the increase of flexion torque associated with the increased friction drag between the link plates.

While FIG. 5(*b*) illustrates the three layers of link plates 2 placed at the projection portion T, it is also possible to place more than three layers or less than three layers of link plates 2, as required.

However, it is preferred to place two to four layers of link plates 2 initially. The reason is as follows. If more than four layers of link plates are placed initially, the contact pressure surface between these link plates is increased because the link plates in such a large number of layers are press-mounted at a time. This leads to a fear that the chain 1 may be decreased in the power transmission efficiency. If less than two layers of link plates are placed initially, the outside surfaces 3*a*, 4*a* of the pins 3 and strips 4 are decreased in the area retained by the assembling die 15 and the pin holes 2*a* of the link plates 2 after the placement of these link plates. This leads to a fear that the pins 3 and strips 4 may not be retained assuredly. The retained area of the outside surfaces 3*a*, 4*a* of the pins 3 and strips 4 may be constantly maintained at effective dimensions by initially placing two to four layers of link plates 2. Therefore, the pins 3 and strips 4 may be positioned more assuredly.

Once the assembling die body 17 is moved down relative to the stopper 18 and fixed to place such as to permit the three layers of link plates 2 initially placed at the projection portions T to be located at the predetermined positions, as shown in FIG. 5(*c*), the assembling die body need not be moved upward till the link plates are assembled to form the chain 1. On this account, the assembling die body 17 may have a vertically separable structure such that a lower part of the assembling die body may be removed after the initial three layers of link plates 2 are placed at the projection portions T.

FIG. 6 illustrates an example of the manufacture method of the chain 1 in the case where the assembling die body 17 of the manufacturing apparatus S shown in FIG. 4 and FIG. 5 has the separable structure. In FIG. 6(*a*), the assembling die body 17 of the manufacturing apparatus S consists of an upper die 19 and a lower die 20 so as to be separated into two parts. The positioning holes 17*a* are extended through these upper die 19 and the lower die 20. The other parts are constituted the same way as those shown in FIG. 4 and FIG. 5 and hence, the description thereof is dispensed with.

The following manufacture method of the chain 1 may be adopted in a case where such an assembling die body 17 is used. After three layers of link plates 2 are placed at the projection portions T, as shown in FIG. 6(*a*), the assembling die body 17 may be moved down and the lower die 20 may be removed, as shown in FIG. 6(*b*).

Subsequently, the upper die 19 is combined with the stopper 18 as shown in FIG. 6(*c*), and the three layers of link plates 2 are slidably moved along the pins 3 and strips 4 to be located at positions to make contact against an upper surface 19*a* of the upper die 19. The lengths of the stopper pin 18*a* are defined such that when the upper die 19 is combined with the stopper 18 as shown in the figure, lengths of the lower ends of the pins 3 and strips 4 inserted in the positioning holes 17*a* are equal to lengths by which the pins 3 and strips 4 project from the link plate 2 located at the outermost position of the chain 1. This constitution permits the upper surface 19*a* of the upper die 19 to serve as the reference surface based on which the link plates 2 are located. Thus, the three layers of link plates 2 are located at the predetermined positions with respect to the width-wise direction of the chain 1. Subsequently, the upper die 16 is moved upward to permit another layer of link plates 2 to be placed, as shown in FIG. 6(*d*). The chain 1 may be assembled according to substantially the same procedure as that of the manufacture method illustrated by FIG. 5.

The above constitution wherein the assembling die body 17 has the separable structure provides the advantages of reducing the height of the assembling die 7, reducing the vertical strokes of these dies including the upper die 16 and reducing the dimensions and the power consumption of the manufacturing apparatus S. As a result, the fabrication costs of the chain 1 may be reduced.

Next, a detailed description is made on a manufacturing apparatus for the above chain 1 according to a third embodiment of the invention. FIG. 7 is a group of schematic diagrams showing an apparatus for manufacturing the chain 1 and a manufacture method of the chain 1 employing the apparatus.

As shown in FIG. 7(*a*), the manufacturing apparatus S for the chain 1 includes: a plurality of dummy pins 26 inserted through the pin holes 2*a* thereby temporarily assembling the link plates 2 in the form of the chain 1; an assembling die 25 for retaining the dummy pins 26; and an upper die 27 disposed upwardly of the assembling die 25 and serving to retain the link plates 2 temporarily assembled.

The dummy pin 26 is formed in a bar-like shape by using a carbon tool steel, alloy tool steel or the like. The dummy pin 26 is removably retained as inserted through a positioning hole 25*a* formed in the assembling die 25 in a manner to project vertically from an upper surface 25*b* of the assembling die 25 by substantially the same length as the width-wise length of the chain 1.

Figure 8:
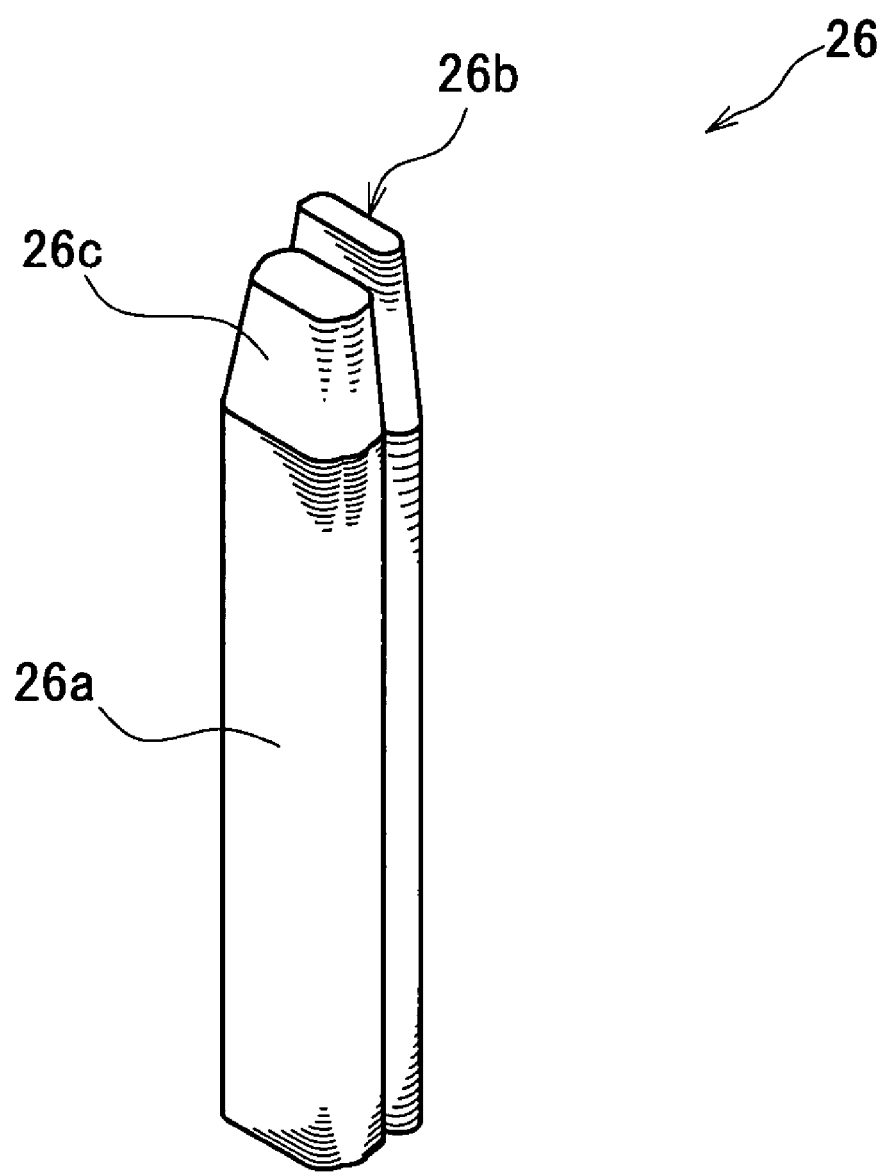
FIG. 8 is a perspective view showing an outward appearance of a dummy pin shown in FIG. 7.

FIG. 8 is a perspective view showing an outward appearance of the dummy pin. Similarly to the paired pin 3 and strip 4, an outer peripheral surface 26*a* of the dummy pin 26 is configured to conform to the inner peripheral contour of the pin hole 2*a*, as shown in the figure. It is preferred that a diametrical dimension of the outer peripheral surface 26*a* is defined to be 60 µm to 100 µm smaller than a diametrical dimension of an outer peripheral surface defined the paired pin 3 and strip 4 press-inserted through the pin hole. In this embodiment, the diametrical dimension of the outer peripheral surface 26*a* is about 80 µm smaller than that of the pin/strip pair. Such a constitution permits the dummy pin 26 to be easily inserted into or removed from the pin hole 2*a* and to be reliably positioned when inserted into the pin hole 2*a*.

As shown in the figure, the dummy pin 26 is formed with a step at an end face 26*b* thereof. When the tip ends of the pin 3 and strip 4 are pressed against the end face 26*b* of the dummy pin 26 in order to press-insert the pin and strip, this step is capable of positioning the pin 3 and strip 4 with respect to the axial direction of the pin in a manner that the pin 3 and the strip 4 having the different axial lengths may have the same axial positional relation as that of the pin and strip assembled in the chain 1.

The dummy pin 26 is further formed with a chamfer portion 26*c* at an end portion thereof. The chamfer portion 26*c* permits the dummy pin 26 to be easily inserted into the pin hole 2*a* of the link plate 2, thus facilitating the temporary assembling of the link plates 2.

As shown in FIG. 7(*a*), the assembling die 25 is a die formed from a carbon tool steel, alloy tool steel or the like and possessing the upper surface 25*b* defining a horizontal plane. The upper surface 25*b* is formed with the plural positioning holes 25*a* which receive the dummy pins 26 and which are extended vertically to the upper surface 25*b*. The positioning holes 25*a* in adjoining relation define the same pitch width as the pitch width of the chain 1. The positioning holes 25*a* are arranged in a line along a longitudinal direction of the assembling die 25 so as to be able to retain as many dummy pins 26 as the pin members P required for forming the chain 1. An inside surface of the positioning hole 25a is configured to conform to an outer peripheral contour of the dummy pin 26. A clearance defined between the inserted dummy pin 26 and the positioning hole 25a is defined to be large enough to provide smooth insertion/removal of the dummy pin but small enough to obviate the free play such as backlash of the dummy pin.

The positioning hole 25a is provided with a spring 25d, one end of which is in contact against a lower end face 26d of the dummy pin 26, and the other end of which is in contact against an unillustrated spring seat or the like fixed to the assembling die 25. Thus, the dummy pin 26 is biased upwardly by means of the spring 25d so as to be retained as projecting from the upper surface 25b. When a downward force is applied to the end face 26b of the dummy pin 26, the dummy pin 26 is accommodated in the positioning hole 25a.

The assembling die 25 of this arrangement constitutes dummy-pin retaining means for retaining the dummy pins 26 as arranging the dummy pins just as the pin members P are assembled to form the chain 1.

The upper die 27 is formed in a rectangular solid shape by using a carbon tool steel, alloy tool steel or the like. The upper die 27 is formed with a plurality of through-holes 27b in correspondence to the positioning holes 25a of the assembling die 25, the through-holes capable of receiving the dummy pins 26 or the paired pins 3 and strips 4 projected from the pin holes 2a. An inside surface of the through-hole 27b may be so configured as to receive the dummy pin 26 or the paired pin 3 and strip 4. According to the embodiment, the inside surface of the through-hole has a configuration which conforms to the outer peripheral contour defined by the paired pin 3 and strip 4 assembled to form the chain 1, and which coincides with the inner peripheral contour of the pin hole 2a of the link plate 2 located to form the chain 1. This constitution is adapted to position the pin 3 and strip 4 in the through-hole 27b as matching the outer peripheral contour defined by the paired pin 3 and strip 4 with the inner peripheral contour of the pin hole 2a. This facilitates the press-insertion of the pin 3 and strip 4, as inserted in the through-hole 27b, into the pin hole 2a, as will be described hereinlater.

The upper die 27 is mounted to the unillustrated pressing machine along with the assembling die 25. The pressing machine is so operated as to reciprocate these dies vertically in respective arbitrary ranges of the strokes of the dies as maintaining these dies in parallel to each other. The pressing machine may also be operated to fix the respective dies at any position in the above range.

Next, description is made on a manufacture method of the chain 1 employing this apparatus S for manufacturing the chain 1.

Figure 7A:
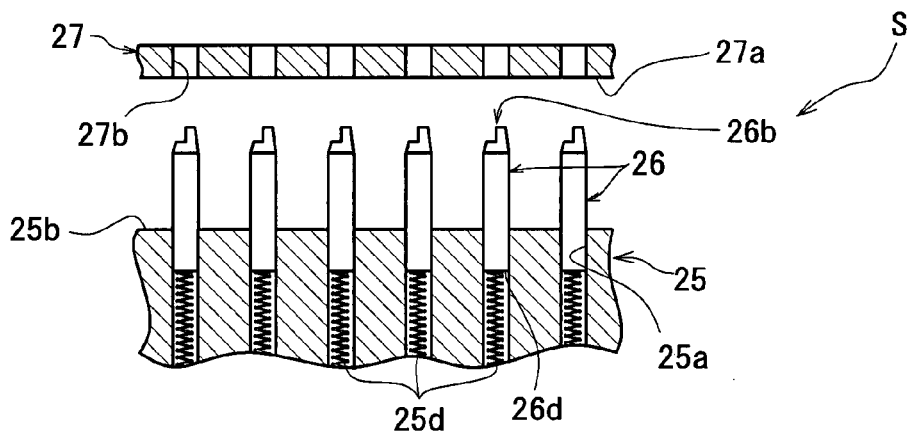
FIG. 7 is a group of schematic diagrams showing a chain manufacturing apparatus according to a third embodiment of the invention, and a procedure of a chain manufacture method employing the apparatus.

The chain 1 is fabricated as follows. First, as shown in FIG. 7(a), plural link plates 2 are sequentially placed on the upper surface 25b of the assembling die 25 by inserting the dummy pins 26 through the pin holes 2a of the link plates 2, the dummy pins projecting from the upper surface 25b of the assembling die 25.

Figure 7B:
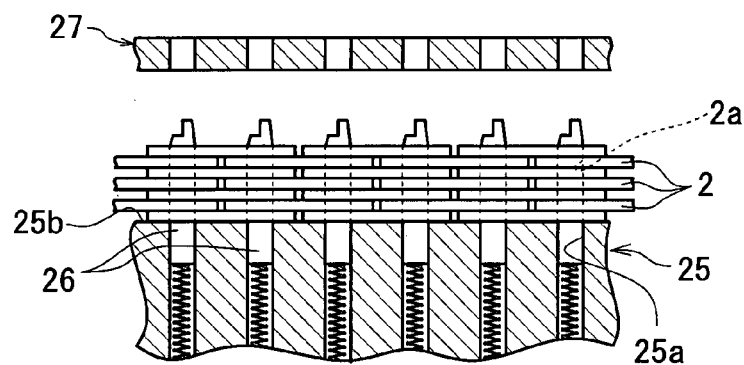

As shown in FIG. 7(b), the dummy pins 26 are inserted through the pin holes 2a for placing the link plates 2 in layers on the upper surface 25b of the assembling die 25 in the longitudinal and width-wise directions of the chain 1 and according to the predetermined array pattern to form the chain. Thus, the plural link plates 2 are arranged just as they are assembled to form the chain 1. Namely, these link plates 2, as temporarily assembled, are retained on the upper surface 25b of the assembling die 25 such that the chain 1 may be completed simply by press-inserting the pins 3 and strips 4 through the link plates.

Figure 7C:
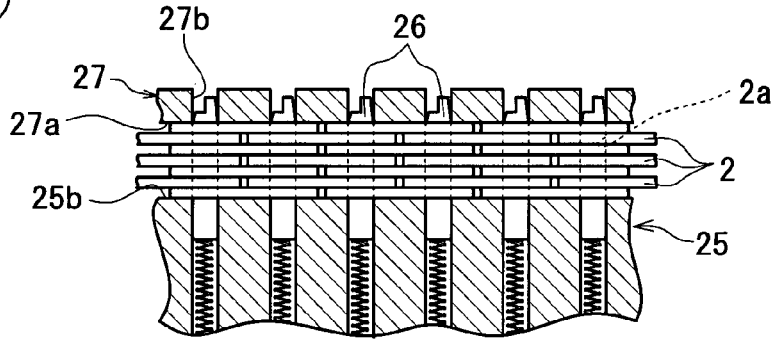

Subsequently, as shown in FIG. 7(c), the upper die 27 disposed upwardly of the assembling die 25 is moved down for inserting the ends of the dummy pins 26 into the through-holes 27b and for pressing its lower surface 27a against the temporarily assembled link plates 2 thereby to fix the link plates. Thus, the individual dummy pins 26 so arranged are positively positioned, while the plural link plates 2 placed in layers are positively fixed as clamped between the upper die and the assembling die 25.

Figure 7D:
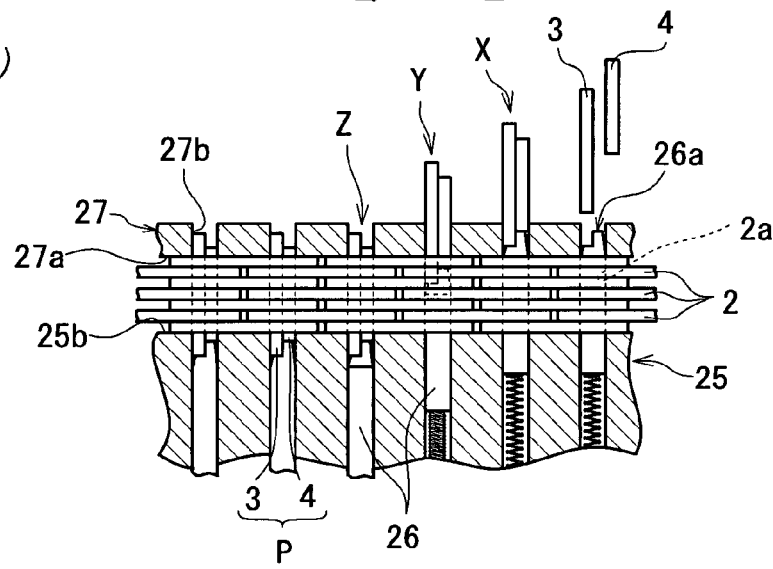

Subsequently, as shown in FIG. 7(d), the pin 3 and strip 4 as the pin member P are inserted into the through-hole 27b of the upper die 27 and are further inserted downwardly, whereby the pin 3 and strip 4 are press-inserted through the pin holes 2a. At this time, the dummy pin 26 is pushed downward by the pin 3 and strip 4 so as to be accommodated in the positioning hole 25a of the assembling die 25.

States X, Y, Z in FIG. 7(d) show moment-to-moment changes of the positional relation between the paired pin 3 and strip 4 and the dummy pin 26 in this order during the press-insertion of the paired pin 3 and strip 4 into the pin hole 2a. FIG. 7(d) depicts the states X, Y, Z in the same drawing in the interest of explanation of the time course of change of the above positional relation.

First, as illustrated by the state X, an unillustrated jig or the like is used for inserting the pin 3 and strip 4 into the through-hole 7a (sic) of the upper die 27 and pressing the end faces of the pin 3 and strip 4 against the end face 26b of the dummy pin 26. At this time, the through-hole 7a (sic) positions the pin 3 and strip 4 in a manner to match the outer peripheral contour of the pin 3 and strip 4 with the inner peripheral contour of the pin hole 2a, as described above.

In the meantime, the step formed at the end face 26b of the dummy pin 26 axially positions the pin 3 and strip 4 so that the pin 3 and strip 4 having the different axial lengths may have the same axial positional relation as that of the pin and strip assembled to form the chain 1.

Subsequently, as illustrated by the state Y, the pin 3 and strip 4 in the through-hole 7a (sic) are progressively press-inserted from the upper side into the pin holes 2a of the layered link plates 2 by means of a press-insertion die or the like mounted to the unillustrated pressing machine. In the meantime, the dummy pin 26 is progressively pushed downward by the end faces of the pin 3 and strip 4. As illustrated by the state Z, the pin 3 and strip 4 are press-inserted through the layered link plates 2 to a predetermined position.

While the embodiment uses the jig or the like for inserting the pin 3 and strip 4 into the through-hole 7a (sic), a worker may manually insert the pin and strip. While the embodiment uses the press-insertion die or the like for press-inserting the pin 3 and strip 4 into the pin holes 2a, the pin 3 and strip 4 may be press-inserted by the worker using a jig or the like.

As described above, the pins 3 and strips 4 are press-inserted in a manner to replace the dummy pins 26 inserted through the pin holes 2a of the link plates 2 temporarily assembled on the upper surface 25b of the assembling die 25, whereby the chain 1 having the linear form is assembled. Then, the chain 1 in the endless loop form may be obtained by interconnecting the opposite ends of the chain 1 in the linear form.

According to the aforementioned manufacture method of the chain 1 according to the embodiment, the link plates 2 are placed in layers as inserting the dummy pins 26 into the pin holes 2a thereof whereby the link plates 2 are maintained in the state temporarily assembled as the chain 1. Hence, the link plates 2 placed in layers may be positioned as exactly aligning the pin holes 2a with one another. This permits the pins 3 and strips 4 to be positively press-inserted through the pin holes 2a of the link plates 2 and hence, the fabrication of the chain 1 is facilitated.

The manufacturing apparatus S for the chain 1 according to the embodiment accomplishes the positioning of the link plates 2 by temporarily assembling the link plates 2 according to the aforementioned method and removably retains the dummy pins 26 by means of the assembling die 25. Therefore, the apparatus is capable of replacing the dummy pins 26 with the pins 3 and strips 4 in the state where the link plates are temporarily assembled. This permits the pins 3 and strips 4 to be positively press-inserted through the pin holes 2a of the link plates 2 and hence, the fabrication of the chain 1 is facilitated.

While the foregoing embodiment is constituted to press-insert each pair of pin 3 and strip 4 into the pin holes 2a, it is also possible to press-insert plural pin/strip pairs or the total number of pin/strip pairs at a time.

The manufacturing apparatuses and manufacture methods of the chain 1 according to the embodiments of the invention facilitate the fabrication of the chain 1 because the pin members and the link plates are exactly positioned so that the pin members P may be positively press-inserted through the pin holes 2a of the link plates 2.

In the chain 1 wherein the pins 3 and strips 4 are press-inserted through the pin holes 2a of the link plates 2, as illustrated by the foregoing embodiments, a particularly great force is required for inserting and press-inserting the pins, while these components are required to be positioned with high precisions. However, if a chain is fabricated according to any one of the chain-1 manufacture methods of the foregoing embodiments, the fabrication of the chain may be benefited by a particularly high effect to reduce chain assembly failure. This results in a shortened cycle time of a chain assembling operations.

The manufacture method and manufacturing apparatus of power transmission chain according to the invention are not limited to the foregoing embodiments. As needed, changes or modifications may be made to the constitution of the chain to be manufactured, the configuration or arrangement of the link plates, the constitutions and configurations of the assembling die and upper die and the like in accordance with the spirits of the invention.

According to the foregoing embodiments, for example, the components are assembled to form one chain 1 having the linear form and thereafter, the endless chain 1 is obtained by interconnecting the opposite ends of the above chain. However, it is also possible to use an assembling die adapted for assembling the endless chain 1 or the like for fabricating the endless chain 1.

While the foregoing embodiments illustrate the chain 1 wherein the pin member P consisting of the pin 3 and the strip 4 is inserted into one pin hole, the invention is also applicable to, for example, a chain wherein the strip is replaced by another pin member, a chain including a pin member constituted by a single member, and the like.

While the foregoing embodiments illustrate the chain wherein the pin 3 and strip 4 are press-inserted through the pin holes 2a, the invention is also applicable to a so-called loose-type chain wherein these components are simply inserted through the pin holes but not press-inserted. In the chain 1 manufactured according to the foregoing embodiments, the link plate 2 is formed with two pin holes (the first and second pin holes 2a). However, the invention may also be applied to a chain including a link plate wherein these pin holes are connected each other to form a single pin hole which practically functions as the first and second pin holes 2a.

What is claimed is:

1. A manufacture method for manufacturing a power transmission chain including: a plurality of link plates possessing pin holes and placed in layers in a width-wise direction of the power transmission chain; and a plurality of pin members inserted through the pin holes for interconnecting the plural link plates, the method comprising:
  retaining first ends of the plural pin members and arranging the plural pin members as if the plural pin members are assembled in the power transmission chain;
  clamping outer circumferences of the plural pin members by a retainer jig, and locating the retainer jig on a second end side of the plural pin members to define projection portions protruding out of the retainer jig on the second end side of the plural pin members for allowing the projection portions to be inserted into the pin holes of the link plates; and
  locatably assembling the link plates with the plural pin members by inserting the projection portions into the pin holes of the link plates.

2. A manufacture method according to claim 1, further comprising slidably moving the link plates mounted on the projection portions along the plural pin members from the second end side of the plural pin members toward a first end side of the plural pin members, thereby locating the link plates at predetermined positions with respect to the width-wise direction of the power transmission chain.

3. A manufacture method for manufacturing a power transmission chain including: a plurality of link plates possessing pin holes and placed in layers in a width-wise direction of the power transmission chain; and a plurality of pin members inserted through the pin holes for interconnecting the plural link plates,
  wherein the following steps (b) to (e) are repeated subsequent to the following step (a), thereby sequentially placing the link plates in layers according to a predetermined array pattern and assembling the link plates:
  (a) the step of retaining first ends of the plural pin members thereby arranging the plural pin members as if the plural pin members are assembled in the power transmission chain;
  (b) the step of retaining second ends of the plural pin members as maintaining axes of the plural pin members in parallel to the width-wise direction of the power transmission chain to be fabricated and as allowing a predetermined number of link plate layers to be placed at the respective second ends;
  (c) the step of inserting the respective second ends of the pin members through the pin holes of the link plates thereby placing the predetermined number of link plate layers at the respective second ends of the pin members;
  (d) the step of releasing the second ends of the pin members from the retained state established by the step (b);
  (e) the step of slidably moving the link plates, mounted on the pin members in the step (c), along the pin members thereby locating the link plates at predetermined positions with respect to the width-wise direction of the power transmission chain.

4. The manufacture method according to claim 3, wherein the step (a) is performed to arrange the plural pin members in a pattern to impart an endless loop form to the power transmission chain, thereby permitting each of the subsequent steps to assemble the power transmission chain in the endless loop form.

5. The manufacture method according to claim 3, wherein the step (a) is performed to arrange the plural pin members in a pattern to impart a linear form to the power transmission chain, thereby permitting each of the subsequent steps to assemble the power transmission chain in the linear form, the method further comprising a step of interconnecting opposite ends of the power transmission chain assembled in the linear form by the above steps.

6. The manufacture method according to claim 3, wherein the predetermined number of link plate layers placed by the step (c) is one.

7. A manufacture method for manufacturing a power transmission chain including: a plurality of link plates possessing pin holes and placed in layers in a width-wise direction of the power transmission chain; and a plurality of pin members inserted through the pin holes for interconnecting the plural link plates, wherein the following steps (b) to (e) are repeated a predetermined number of times subsequent to the following step (a) thereby placing the link plates in a predetermined number of layers and subsequently, and the steps (c) and (e) are repeated thereby sequentially placing the link plates in layers according to a predetermined array pattern and assembling the link plates:

(a) the step of retaining first ends of the plural pin members thereby arranging the plural pin members as if the plural pin members are assembled in the power transmission chain;

(b) the step of retaining second ends of the plural pin members as maintaining axes of the plural pin members in parallel to the width-wise direction of the power transmission chain to be fabricated and as allowing a predetermined number of link plate layers to be placed at the respective second ends;

(c) the step of inserting the respective second ends of the pin members through the pin holes of the link plates thereby placing the predetermined number of link plate layers at the respective second ends of the pin members;

(d) the step of releasing the second ends of the pin members from the retained state established by the step (b);

(e) the step of slidably moving the link plates, mounted on the pin members in the step (c), along the pin members thereby locating the link plates at predetermined positions with respect to the width-wise direction of the power transmission chain.

8. A manufacture method for manufacturing a power transmission chain including: a plurality of link plates possessing pin holes and placed in layers in a width-wise direction of the power transmission chain; and a plurality of pin members inserted through the pin holes for interconnecting the plural link plates, wherein the following steps (c) to (d) are repeated subsequent to the following steps (a), (b) thereby sequentially placing the link plates in layers according to a predetermined array pattern and assembling the link plates:

(a) the step of inserting the pin members in a retainer jig which receives the pin members therein for retaining the pin members at outside surfaces thereof and for arranging the pin members as if the pin members are assembled in the power transmission chain;

(b) the step of projecting a respective first end of the pin members from the retainer jig by a length required for placing the link plates in a predetermined number of layers in the width-wise direction of the power transmission chain;

(c) the step of inserting the respective first end of the pin members through the pin holes of the link plates thereby placing the predetermined number of link plate layers at a respective projection portion defined by the respective projected first end of the pin members;

(d) the step of further projecting the respective first end of the pin members from the retainer jig by a length required for placing the predetermined number of link plate layers at the respective first end, and of slidably moving the link plates, mounted on the pin members, along the pin members.

9. The manufacture method according to claim 8, wherein the predetermined number of link plate layers placed by the steps (b), (c), (d) is one.

10. A manufacture method for manufacturing a power transmission chain including: a plurality of link plates possessing pin holes and placed in layers in a width-wise direction of the power transmission chain; and a plurality of pin members inserted through the pin holes for interconnecting the plural link plates, wherein the following step (e) is repeated subsequent to the following steps (a), (b), (c), (d) thereby sequentially placing the link plates in layers according to a predetermined array pattern and assembling the link plates:

(a) the step of inserting the pin members in a retainer jig which receives the pin members therein for retaining the pin members at outside surfaces thereof and for arranging the pin members as if the pin members are assembled in the power transmission chain;

(b) the step of projecting a respective first end of the pin members from the retainer jig by a length required for placing the link plates in a predetermined number of layers in the width-wise direction of the power transmission chain;

(c) the step of inserting the respective first end of the pin members through the pin holes of the link plates thereby placing the predetermined number of link plate layers at a respective projection portion defined by the respective projected first end of the pin members;

(d) the step of further projecting the respective first end of the pin members from the retainer jig and of slidably moving the link plates mounted on the pin members along the pin members thereby locating the link plates at positions equivalent to predetermined positions thereof when the link plates are assembled in the power transmission chain;

(e) the step of inserting anew the respective first end of the pin members through predetermined number of link plate layers and of slidably moving the link plates along the pin members for locating the link plates at positions equivalent to predetermined positions thereof when the link plates are assembled in the power transmission chain.

11. The manufacture method according to claim 10, wherein the predetermined number of link plate layers placed by the steps (b), (c), (d) is two to four.

12. A manufacture method for manufacturing a power transmission chain including: a plurality of link plates possessing pin holes and placed in layers in a width-wise direction of the power transmission chain; and a plurality of pin members inserted through the pin holes for interconnecting the plural link plates, the method comprising:

inserting dummy pins, which are removably insertable in the pin holes, into the pin holes for placing the link plates in layers, temporarily assembling the plural link plates to form the power transmission chain; and subsequently inserting the pin members through the pin holes for replacing the dummy pins inserted in the pin holes.

13. A manufacture method for manufacturing a power transmission chain including: a plurality of link plates possessing pin holes and placed in layers in a width-wise direction of the power transmission chain; and a plurality of pin members inserted through the pin holes for interconnecting the plural link plates, wherein the following steps are performed to assemble the link plates according to a predetermined array pattern, the steps including:

(a) a step of inserting dummy pins, which are removably insertable in the pin holes, into the pin holes for placing the link plates in layers thereby temporarily assembling the link plates to form the power transmission chain;

(b) a step of fixing the temporarily assembled link plates by clamping; and (c) a step of inserting the pin members through the pin holes for pushing out the dummy pins from the pin holes, thereby replacing the dummy pins in the pin holes with the pin members.

14. A manufacturing apparatus for manufacturing a power transmission chain including: a plurality of link plates possessing pin holes and placed in layers in a width-wise direction of the power transmission chain; and a plurality of pin members inserted through the pin holes for interconnecting the plural link plates, the apparatus comprising:

first-end retaining means for retaining first ends of the plural pin members as arranging the pin members as if the pin members are assembled to form the power transmission chain;

second-end retaining means for releasably retaining second ends of the plural pin members as maintaining axes of the pin members substantially in parallel to the width-wise direction of the power transmission chain to be fabricated and as allowing the link plates in a predetermined number of layers to be placed at the respective second ends of the pin member, wherein the second-end retaining means releasably clamps outer circumferences of the pin members on a second end side of the pin members; and link-plate locating means for slidably moving the link plates placed at the second ends of the pin members along the pin members, thereby locating the link plates at predetermined positions with respect to the width-wise direction of the power transmission chain.

15. The manufacture apparatus according to claim 14, wherein the first-end retaining means comprises a die formed with a plurality of positioning holes along a longitudinal direction of the power transmission chain in order to arrange the pin members as if the pin members are assembled to form the power transmission chain, the positioning holes receivingly retaining the first ends of the pin members.

16. The manufacture apparatus according to claim 15, wherein the plural positioning holes have an inner peripheral contour conforming to an outer peripheral contour of the pin members.

17. The manufacture apparatus according to claim 15 or 16, wherein the plural positioning holes are designed to have a clearance for permitting the pin members to be smoothly inserted therein or removed therefrom.

18. A manufacturing apparatus for manufacturing a power transmission chain including: a plurality of link plates possessing pin holes and placed in layers in a width-wise direction of the power transmission chain; and a plurality of pin members inserted through the pin holes for interconnecting the plural link plates, the apparatus comprising:

first-end retaining means for retaining first ends of the plural pin members as arranging the pin members as if the pin members are assembled to form the power transmission chain;

second-end retaining means for releasably retaining second ends of the plural pin members as maintaining axes of the pin members substantially in parallel to the width-wise direction of the power transmission chain to be fabricated and as allowing the link plates in a predetermined number of layers to be placed at the respective second ends of the pin member; and link-plate locating means for slidably moving the link plates placed at the second ends of the pin members along the pin members, thereby locating the link plates at predetermined positions with respect to the width-wise direction of the power transmission chain, wherein the second-end retaining means includes first and second retaining plates for releasably clamping an outer periphery of the second end of the pin member having the first end thereof retained by the first-end retaining means, and wherein at least one of the retaining plates is formed with a notch at its retaining surface for retaining the pin member, the notch formed in conformity to an outer peripheral contour of the pin member.

19. A manufacturing apparatus for manufacturing a power transmission chain including: a plurality of link plates possessing pin holes and placed in layers in a width-wise direction of the power transmission chain; and a plurality of pin members inserted through the pin holes for interconnecting the plural link plates, the apparatus comprising:

first-end retaining means for retaining first ends of the plural pin members as arranging the pin members as if the pin members are assembled to form the power transmission chain;

second-end retaining means for releasably retaining second ends of the plural pin members as maintaining axes of the pin members substantially in parallel to the width-wise direction of the power transmission chain to be fabricated and as allowing the link plates in a predetermined number of layers to be placed at the respective second ends of the pin member; and link-plate locating means for slidably moving the link plates placed at the second ends of the pin members along the pin members, thereby locating the link plates at predetermined positions with respect to the width-wise direction of the power transmission chain, wherein the link-plate locating means includes an upper die which includes a contact surface brought into contact with side surfaces of the link plates and through-holes formed vertically to the contact surface and allowing the pin members retained by the first-end retaining means or the second-end retaining means to be inserted therethrough, and which presses the link plates in contact with the contact surface in the chain width-wise direction for locating the link plates at the predetermined positions and is free to move relative to the link plates in the chain longitudinal direction.

20. A manufacturing apparatus for manufacturing a power transmission chain including: a plurality of link plates possessing pin holes and placed in layers in a width-wise direction of the power transmission chain; and a plurality of pin members inserted through the pin holes for interconnecting the plural link plates, the apparatus comprising:

a retainer jig which receives the pin members therein for retaining the pin members at outside surfaces thereof and for arranging the pin members as if the pin members are assembled to form the power transmission chain;

pin-member projecting means for vertically moving the pin members to project first ends of the pin members from the retainer jig; and link-plate locating means for slidably moving the link plates, mounted on the first ends of the pin members, along the pin members, thereby locating the link plates at predetermined positions with respect to the width-wise direction of the power transmission chain.

21. A manufacturing apparatus for manufacturing a power transmission chain including: a plurality of link plates possessing pin holes and placed in layers in a width-wise direction of the power transmission chain; and a plurality of pin members inserted through the pin holes for interconnecting the plural link plates, the apparatus comprising:

a retainer jig which receives the pin members therein for retaining the pin members at outside surfaces thereof and for arranging the pin members as if the pin members are assembled to form the power transmission chain;

pin-member projecting means for projecting first ends of the pin members from the retainer jig; and link-plate locating means for slidably moving the link plates, mounted on the first ends of the pin members, along the pin members, thereby locating the link plates at predetermined positions with respect to the width-wise direction of the power transmission chain, wherein the retainer jig includes a die which is formed with a horizontal upper surface and which includes a plurality of positioning holes arranged in a longitudinal direction of the power transmission chain, the positioning holes extended from the upper surface to a lower surface of the die for receiving the pin members, designed to have a clearance for permitting the pin members to be smoothly inserted therein or removed therefrom and having an inner peripheral contour conforming to an outer peripheral contour of the pin members, and wherein the pin-member projecting means includes a stopper having a plurality of stopper pins projected therefrom, the stopper pins vertically movably inserted into the plural positioning holes from the lower side of the die and pressing their upper end faces against lower end faces of the pin members inserted in the positioning holes thereby positioning the pin members with respect to the vertical direction, the pin-member projecting means vertically moving the stopper thereby projecting the pin members from the upper surface of the die.

22. The manufacture apparatus according to claim 21, wherein the die has a structure which can be vertically separated into at least two parts, one of which is removable for adjustment of the vertical height of the die.

23. A manufacturing apparatus for manufacturing a power transmission chain including: a plurality of link plates possessing pin holes and placed in layers in a width-wise direction of the power transmission chain; and a plurality of pin members inserted through the pin holes for interconnecting the plural link plates, the apparatus comprising:

a plurality of dummy pins removably insertable in the pin holes; and dummy-pin retaining means for removably retaining the dummy pins as arranging the dummy pins as if the pin members assembled in the power transmission chain are arranged.

24. The manufacture apparatus according to claim 23, wherein the dummy-pin retaining means includes:

a die which is formed with a horizontal upper surface and which includes a plurality of positioning holes arranged in a longitudinal direction of the power transmission chain, the positioning holes extended from the upper surface to a lower surface of the die for receiving the dummy pins, designed to have a clearance for permitting the dummy pins to be smoothly inserted therein or removed therefrom and having an inner peripheral contour conforming to an outer peripheral contour of the dummy pins; and springs which bias the dummy pins upwardly for inserting the dummy pins in the positioning holes and projecting the dummy pins from the upper surface of the die when a downward force is applied to the dummy pins.

25. The manufacture apparatus according to claim 23, wherein the dummy pin has an outside diametrical dimension defined to be 60 to 100 μm smaller than an outside diametrical dimension of the pin member.

\* \* \* \* \*